United States Patent
Lee et al.

(10) Patent No.: US 11,003,689 B2
(45) Date of Patent: *May 11, 2021

(54) DISTRIBUTED DATABASE TRANSACTION PROTOCOL

(71) Applicant: SAP SE, Walldorf (DE)

(72) Inventors: Juchang Lee, Seoul (KR); Chang Gyoo Park, Seoul (KR); Kyu Hwan Kim, Seoul (KR); Deok Koo Kim, Seoul (KR)

(73) Assignee: SAP SE, Walldorf (DE)

( * ) Notice: Subject to any disclaimer, the term of this patent is extended or adjusted under 35 U.S.C. 154(b) by 119 days.

This patent is subject to a terminal disclaimer.

(21) Appl. No.: 16/351,001

(22) Filed: Mar. 12, 2019

(65) Prior Publication Data

US 2019/0213203 A1    Jul. 11, 2019

Related U.S. Application Data

(63) Continuation of application No. 14/866,449, filed on Sep. 25, 2015, now Pat. No. 10,268,743.

(60) Provisional application No. 62/182,354, filed on Jun. 19, 2015.

(51) Int. Cl.
*G06F 16/20* (2019.01)
*G06F 16/27* (2019.01)
*G06F 16/23* (2019.01)

(52) U.S. Cl.
CPC ........ *G06F 16/273* (2019.01); *G06F 16/2379* (2019.01)

(58) Field of Classification Search
None
See application file for complete search history.

(56) References Cited

U.S. PATENT DOCUMENTS

| 5,613,113 | A | 3/1997 | Goldring |
| 6,397,352 | B1 | 5/2002 | Chandrasekaran et al. |
| 6,745,209 | B2 | 6/2004 | Holenstein et al. |
| 7,133,891 | B1 | 11/2006 | Uceda-Sosa |
| 7,290,056 | B1 * | 10/2007 | McLaughlin, Jr. .......... H04L 43/0852 709/201 |
| 7,305,421 | B2 | 12/2007 | Cha et al. |
| 7,478,400 | B1 | 1/2009 | Banerjee et al. |
| 7,890,457 | B2 | 2/2011 | Dias et al. |

(Continued)

OTHER PUBLICATIONS

Aulbach et al., "Extensibility and Data Sharing in Evolving Multi-Tenant Databases," in 2011 IEEE 27th International Conference on Data Engineering. IEEE, pp. 99-110 (2011).

(Continued)

*Primary Examiner* — Belix M Ortiz Ditren
(74) *Attorney, Agent, or Firm* — Klarquist Sparkman, LLP

(57) ABSTRACT

Technologies are described for facilitating transaction processing within a database environment having a coordinator node, a first worker node, and at least a second worker node. The first worker node sends a request from to the coordinator node for at least a first synchronization token maintained by the coordinator node. The first worker node receives the at least a first synchronization token from the coordinator node. The first worker node assigns the at least a first synchronization token to a snapshot as a snapshot ID value. The snapshot is executed at the first worker node. The first worker node forwards the snapshot ID value to the at least a second worker node.

50 Claims, 17 Drawing Sheets

(56) References Cited

U.S. PATENT DOCUMENTS

| | | |
|---|---|---|
| 8,442,962 B2 | 5/2013 | Lee et al. |
| 8,700,660 B2 | 4/2014 | Lee et al. |
| 8,768,927 B2 | 7/2014 | Yoon et al. |
| 8,775,682 B1 | 7/2014 | Mathias et al. |
| 8,782,100 B2 | 7/2014 | Yoon et al. |
| 8,793,276 B2 | 7/2014 | Lee et al. |
| 8,909,604 B1 | 12/2014 | Holenstein et al. |
| 8,918,436 B2 | 12/2014 | Yoon et al. |
| 8,935,205 B2 | 1/2015 | Hildenbrand et al. |
| 9,009,182 B2 | 4/2015 | Renkes et al. |
| 9,037,677 B2 | 5/2015 | Lee et al. |
| 9,063,969 B2 | 6/2015 | Lee et al. |
| 9,098,522 B2 | 8/2015 | Lee et al. |
| 9,632,878 B1 | 4/2017 | Maccanti |
| 9,881,014 B1 | 1/2018 | Bono et al. |
| 9,959,178 B2 | 5/2018 | Lee et al. |
| 10,025,673 B1 | 7/2018 | Maccanti |
| 2003/0014598 A1 | 1/2003 | Brown |
| 2003/0061537 A1 | 3/2003 | Cha et al. |
| 2003/0182329 A1 | 9/2003 | Sato |
| 2004/0030703 A1 | 2/2004 | Bourbonnias et al. |
| 2005/0021567 A1 | 1/2005 | Holenstein et al. |
| 2005/0193041 A1 | 9/2005 | Bourbonnais et al. |
| 2005/0204106 A1 | 9/2005 | Testardo |
| 2006/0047928 A1 | 3/2006 | Bhasin et al. |
| 2006/0190497 A1 | 8/2006 | Inturi et al. |
| 2006/0190498 A1 | 8/2006 | Pruet, III |
| 2007/0088763 A1 | 4/2007 | Yahalom et al. |
| 2007/0100909 A1 | 5/2007 | Padovano et al. |
| 2007/0186068 A1 | 8/2007 | Agrawal |
| 2008/0028009 A1 | 1/2008 | Ngo |
| 2008/0098113 A1 | 4/2008 | Hansen et al. |
| 2008/0065670 A1 | 5/2008 | Cha et al. |
| 2008/0209145 A1 | 8/2008 | Ranganathan et al. |
| 2008/0228834 A1 | 9/2008 | Burchall et al. |
| 2009/0024851 A1* | 1/2009 | Andrade ............... H04L 9/3234 713/176 |
| 2009/0037416 A1 | 2/2009 | Raghavan et al. |
| 2009/0240739 A1 | 9/2009 | Bhatt et al. |
| 2010/0114826 A1 | 5/2010 | Voutilainen et al. |
| 2010/0274587 A1 | 10/2010 | Gamboa |
| 2011/0087633 A1 | 4/2011 | Kreuder et al. |
| 2011/0218964 A1 | 9/2011 | Hagan et al. |
| 2011/0289049 A1 | 11/2011 | Zeng et al. |
| 2012/0084273 A1 | 4/2012 | Lee et al. |
| 2012/0084274 A1 | 4/2012 | Renkes et al. |
| 2012/0102006 A1* | 4/2012 | Larson ................. G06F 16/951 707/703 |
| 2012/0166407 A1 | 6/2012 | Lee et al. |
| 2012/0167098 A1 | 6/2012 | Lee et al. |
| 2012/0310881 A1 | 12/2012 | Shadmon |
| 2012/0310985 A1 | 12/2012 | Gale et al. |
| 2013/0024422 A1 | 1/2013 | Konagolli Suresh et al. |
| 2013/0124475 A1 | 5/2013 | Hildenbrand et al. |
| 2013/0166534 A1 | 6/2013 | Yoon et al. |
| 2013/0166553 A1 | 6/2013 | Yoon et al. |
| 2013/0166554 A1 | 6/2013 | Yoon et al. |
| 2013/0275457 A1 | 10/2013 | Lee et al. |
| 2013/0275467 A1 | 10/2013 | Lee et al. |
| 2013/0275468 A1 | 10/2013 | Lee et al. |
| 2013/0275550 A1 | 10/2013 | Lee et al. |
| 2013/0290282 A1 | 10/2013 | Faerber et al. |
| 2013/0304714 A1 | 11/2013 | Lee et al. |
| 2014/0025634 A1 | 1/2014 | Dennehy et al. |
| 2014/0122439 A1 | 5/2014 | Faerber et al. |
| 2014/0122452 A1 | 5/2014 | Faerber et al. |
| 2014/0136473 A1 | 5/2014 | Faerber et al. |
| 2014/0136788 A1 | 5/2014 | Faerber et al. |
| 2014/0149353 A1 | 5/2014 | Lee et al. |
| 2014/0149368 A1 | 5/2014 | Lee et al. |
| 2014/0149527 A1 | 5/2014 | Lee et al. |
| 2014/0156619 A1 | 6/2014 | Lee et al. |
| 2014/0222418 A1 | 8/2014 | Richtarsky et al. |
| 2014/0244628 A1 | 8/2014 | Yoon et al. |
| 2014/0297686 A1 | 10/2014 | Lee et al. |
| 2014/0304219 A1 | 10/2014 | Yoon et al. |
| 2015/0046744 A1 | 2/2015 | Freking |
| 2015/0074082 A1 | 5/2015 | Yoon et al. |
| 2015/0149409 A1 | 5/2015 | Lee et al. |
| 2015/0149413 A1 | 5/2015 | Lee et al. |
| 2015/0149426 A1 | 5/2015 | Kim et al. |
| 2015/0149704 A1 | 5/2015 | Lee et al. |
| 2015/0149736 A1 | 5/2015 | Kwon et al. |
| 2015/0178343 A1 | 6/2015 | Renkes et al. |
| 2015/0242400 A1 | 8/2015 | Bensberg et al. |
| 2015/0242451 A1 | 8/2015 | Bensberg et al. |
| 2015/0261805 A1 | 9/2015 | Lee et al. |
| 2015/0288758 A1 | 10/2015 | Ori |
| 2015/0302037 A1 | 10/2015 | Jackson et al. |
| 2016/0371319 A1 | 12/2016 | Park et al. |
| 2016/0371356 A1 | 12/2016 | Lee et al. |
| 2016/0371357 A1 | 12/2016 | Park et al. |
| 2016/0371358 A1 | 12/2016 | Lee et al. |
| 2019/0005105 A1 | 1/2019 | Park et al. |

OTHER PUBLICATIONS

Bailis et al., "Hat, Not Cap: Towards Highly Available Transactions", in Proceedings of the 14th USENIX Conference on Hot Topics in Operating Systems, pp. 24, USENIX Association (2013).

Bailis et al., "Scalable Atomic Visibility with Ramp Transactions," in Proceedings of the 2014 ACM SIGMOD International Conference on Management of Data. ACM, pp. 27-38 (2014).

Barber et al., "In-Memory Blu Acceleration in IBM's db2 and dashdb: Optimized for Modern Workloads and Hardware Architectures," in Proceedings of the 2015 International Conference on Data Engineering (ICDE). IEEE (2015).

Berenson et al., "A Critique of Ansi SQL Isolation Levels," ACM SIGMOD Record, vol. 24, No. 2, pp. 1-10, (1995).

Bernstein et al., "Concurrency Control and Recovery in Database Systems," (1987).

Bernstein et al., "Optimizing Optimistic Concurrency Control for Tree-Structured, Log-Structured Databases," in Proceedings of the 2015 ACM SIGMOD International Conference on Management of Data. ACM, pp. 1295-1309 (2015).

Binnig et al., "Distributed Snapshot Isolation: Global Transactions Pay Globally, Local Transactions Pay Locally," The International Journal on Very Large Data Bases, vol. 23, No. 6, pp. 987-1011 (2014).

Cha et al., "An Extensible Architecture for Main-Memory Real-Time Storage Systems", RTCSA : 67-73 (1996).

Cha et al., "An Object-Oriented Model for FMS Control", J. Intelligent Manufacturing 7(5): 387-391 (1996).

Cha et al., "Cache-Conscious Concurrency Control of Main-Memory Indexes on Shared-Memory Multiprocessor Systems", VLDB: 181-190 (2001).

Cha et al., "Efficient Web-Based Access to Multiple Geographic Databases Through Automatically Generated Wrappers", WISE : 34-41 (2000).

Cha et al., "Interval Disaggregate: A New Operator for Business Planning", PVLDB 7(13): 1381-1392 (2014).

Cha et al., "Kaleidoscope: A Cooperative Menu-Guided Query Interface", SIGMOD Conference : 387 (1990).

Cha et al., "Kaleidoscope Data Model for an English-like Query Language", VLDB : 351-361 (1991).

Cha et al., "MEADOW: A Middleware for Efficient Access to Multiple Geographic Databases Through OpenGIS Wrappers", Softw., Pract. Exper. 32(4): 377-402 (2002).

Cha et al., "Object-Oriented Design of Main-Memory DBMS for Real-Time Applications", RTCSA : 109-115 (1995).

Cha et al., "Paradigm Shift to New DBMS Architectures: Research Issues and Market Needs", ICDE: 1140 (2005).

Cha et al., "P*TIME: Highly Scalable OLTP DBMS for Managing Update-Intensive Stream Workload", VLDB: 1033-1044 (2004).

Cha et al., "Xmas: An Extensible Main-Memory Storage System", CIKM : 356-362 (1997).

Chang et al., "Bigtable: A Distributed Storage System for Structured Data," ACM Transactions on Computer Systems (TOCS), vol. 26, No. 2, p. 4, (2008).

(56) References Cited

OTHER PUBLICATIONS

Chaudhuri et al., "An Overview of Data Warehousing and OLAP Technology," ACM Sigmod Record, vol. 26, No. 1, pp. 65-74 (1997).
Cooper et al., "Pnuts: Yahoo!'s Hosted Data Serving Platform," Proceedings of the VLDB Endowment, vol. 1, No. 2, pp. 1277-1288 (2008).
DeCandia et al., "Dynamo: Amazon's Highly Available Key-Value Store," ACM SIGOPS Operating Systems Review, vol. 41, No. 6, pp. 205-220 (2007).
DeWitt et al., "Parallel Database Systems: the Future of High Performance Database Systems," Communications of the ACM, vol. 35, No. 6, pp. 85-98 (1992).
Diaconu et al., "Hekaton: SQL Server's Memory-Optimized OLTP Engine," in Proceedings of the 2013 ACM SIGMOD International Conference on Management of Data. ACM, pp. 1243-1254 (2013).
Du et al., "Clock-Si: Snapshot Isolation for Partitioned Data Stores Using Loosely Synchronized Clocks," in Reliable Distributed Systems (SRDS), 2013 IEEE 32nd International Symposium on. IEEE, pp. 173-184 (2013).
Farber et al., SAP HANA Database: Data Management for Modern Business Applications. SIGMOD Record 40(4): 45-51 (2011).
Farber et al., "The SAP HANA Database—An Architecture Overview." IEEE Data Eng. Bull., vol. 35, No. 1, pp. 28-33 (2012).
Fekete et al., "Making Snapshot Isolation Serializable," ACM Transactions on Database Systems (TODS), vol. 30, No. 2, pp. 492-528 (2005).
Hwang et al., "Performance Evaluation of Main-Memory R-tree Variants", SSTD: 10-27 (2003).
Kallman et al., "Hstore: A High-Performance, Distributed Main Memory Transaction Processing System," Proceedings of the VLDB Endowment, vol. 1, No. 2, pp. 1496-1499 (2008).
Kemper et al., "Hyper: A Hybrid OLTP & OLAP Main Memory Database System Based on Virtual Memory Snapshots," in Data Engineering (ICDE), 2011 IEEE 27th International Conference on. IEEE, pp. 195-206 (2011).
Kim et al., "Optimizing Multidimensional Index Trees for Main Memory Access", SIGMOD Conference: 139-150 (2001).
Kung et al., "On Optimistic Methods for Concurrency Control," ACM Transactions on Database Systems (TODS), vol. 6, No. 2, pp. 213-226 (1981).
Lahiri et al., "Cache Fusion: Extending Shared-Disk Clusters with Shared Caches," in VLDB, vol. 1, pp. 683-686 (2001).
Lahiri et al., "Oracle Timesten: An In-Memory Database for Enterprise Applications." IEEE Data Eng. Bull., vol. 36, No. 2, pp. 6-13 (2013).
Larson et al., "High-Performance Concurrency Control Mechanisms for Main-Memory Databases," Proceedings of the VLDB Endowment, vol. 5, No. 4, pp. 298-309, (2011).
Lee et al., "A Performance Anomaly Detection and Analysis Framework for DBMS Development", IEEE Trans. Knowl. Data Eng. 24(8): 1345-1360 (2012).
Lee et al., "Differential Logging: A Commutative and Associative Logging Scheme for Highly Parallel Main Memory Databases", ICDE 173-182 (2001).
Lee et al., "High-Performance Transaction Processing in SAP HANA." IEEE Data Eng. Bull., vol. 36, No. 2, pp. 28-33 (2013).
Lee et al., "SAP HANA Distributed In-Memory Database System: Transaction, Session, and Metadata Management," in Data Engineering (ICDE), 2013 IEEE 29th International Conference on. IEEE, pp. 1165-1173 (2013).
Neumann et al., "Fast Serializable Multi-Version Concurrency Control for Main-Memory Database Systems," in Proceedings of the 2015 ACM SIGMOD International Conference on Management of Data. ACM, pp. 677-689 (2015).
Pandis et al., "Dataoriented Transaction Execution," Proceedings of the VLDB Endowment, vol. 3, No. 1-2, pp. 928-939 (2010).
Park et al., Xmas: An Extensible Main-Memory Storage System for High-Performance Applications. SIGMOD Conference : 578-580 (1998).
Plattner, H., "A Common Database Approach for OLTP and OLAP Using an In-Memory Column Database", in Proceedings of the 2009 ACM SIGMOD International Conference on Management of Data, pp. 1-2. ACM (2009).
Qiao et al., "On Brewing Fresh Espresso: Linkedin's Distributed Data Serving Platform," in Proceedings of the 2013 ACM SIGMOD International Conference on Management of Data. ACM, pp. 1135-1146 (2013).
Roy et al., "The Homeostasis Protocol: Avoiding Transaction Coordination Through Program Analysis," in Proceedings of the 2015 ACM SIGMOD International Conference on Management of Data. ACM, pp. 1311-1326 (2015).
Sikka et al. "Efficient Transaction Processing in SAP HANA Database: the End of a Column Store Myth", in Proceedings of the 2012 ACM SIGMOD International Conference on Management of Data, pp. 731-742. ACM (2012).
Tu et al., "Speedy Transactions in Multicore In-Memory Databases," in Proceedings of the Twenty-Fourth ACM Symposium on Operating Systems Principles. ACM, pp. 18-32 (2013).
Vogels, W., "Eventually Consistent," Communications of the Acm, vol. 52, No. 1, pp. 40-44 (2009).
Weikum et al., "Transactional Information Systems: Theory, Algorithms, and the Practice of Concurrency Control and Recovery," (2001).
Yoo et al., "A Middleware Implementation of Active Rules for ODBMS", DASFAA : 347-354 (1999).
Yoo et al., "Integrity Maintenance in a Heterogeneous Engineering Database Environment", Data Knowl. Eng. 21(3): 347-363 (1997).
Zamanian et al., "Locality-Aware Partitioning in Parallel Database Systems," in Proceedings of the 2015 ACM SIGMOD International Conference on Management of Data. ACM, pp. 17-30 (2015).
Office Action issued in U.S. Appl. No. 14/866,449, dated Jul. 12, 2018, 20 pages.
Notice of Allowance issued in U.S. Appl. No. 14/866,449, dated Dec. 12, 2018, 5 pages.
Office Action issued in U.S. Appl. No. 14/871,675, dated Dec. 29, 2017, 30 pages.
Notice of Allowance issued in U.S. Appl. No. 14/871,675, dated Jun. 7, 2018, 23 pages.
Office Action received in U.S. Appl. No. 14/871,717, dated Jan. 31, 2018, 31 pages.
Notice of Allowance received in U.S. Appl. No. 14/871,717 dated Aug. 30, 2018, 24 pages.
Office Action received in U.S. Appl. No. 14/871,765, dated Dec. 14, 2017, 19 pages.
Office Action received in U.S. Appl. No. 14/871,765 dated Jul. 12, 2018, 19 pages.
Notice of Allowance received in U.S. Appl. No. 14/871,765 dated Jan. 8, 2019, 18 pages.
Office Action received in U.S. Appl. No. 16/122,617, dated May 6, 2020, 28 pages.
Non-Final Office Action received in U.S. Appl. No. 16/122,617, dated Nov. 6, 2019, 37 pages.
Notice of Allowance received in U.S. Appl. No. 16/376,963, dated Dec. 28, 2020, 11 pages.
Office Action received in U.S. Appl. No. 16/376,963 dated Oct. 28, 2020, 24 pages.

\* cited by examiner

DISTRIBUTED DATABASE TRANSACTION PROTOCOL

CROSS REFERENCE TO RELATED APPLICATION

This application is a continuation of, and incorporates by reference, U.S. patent application Ser. No. 14/866,449, filed Sep. 25, 2015, which claims the benefit of, and incorporates by reference, U.S. Provisional Patent Application No. 62/182,354, filed Jun. 19, 2015.

FIELD

The present disclosure generally relates to processing database read and write operations in a distributed environment. Particular implementations relate to coordination of read and write operations among a coordinator host and one or more worker hosts.

BACKGROUND

Database performance can be enhanced by distributing information, such as source tables, among multiple hosts. For example, a number of hosts may store different tables in the database system, or tables can be partitioned among multiple hosts. The ability to distribute a database system among multiple hosts can provide opportunities to increase system performance, such as by distributing workloads among CPUs located at the different hosts, rather than relying on the capabilities of a single host. However, distributed systems can present challenges in ensuring that database operations are carried out in a way that provides queries with accurate data, but without requiring so much coordination between hosts that the performance of the distributed system is significantly adversely affected.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for providing access to database records stored at multiple hosts in a database environment that includes a coordinator node, a first worker node, and at least a second worker node. When a multi-node statement or transaction is received by the first worker node, the first worker node requests a global synchronization token maintained by the coordinator node. The coordinator node sends the global synchronization token to the first worker node and starts a global snapshot associated with the request. The first worker node assigns the global synchronization token to the snapshot as the snapshot ID value. The snapshot (such as a transaction, statement, or query) is executed at the first worker node and the snapshot ID value is sent to the at least a second worker node. The first worker node sends a request, such as asynchronously, to the coordinator node to end the global snapshot associated with the request. The coordinator node ends the global snapshot when it receives the request from the first worker node. The worker nodes may request and receive additional synchronization tokens from the coordinator node, such as a watermark cached by the coordinator node and associated with the status of the first or second worker nodes.

In another aspect, the present disclosure provides for managing commit operations for statements or transactions executed at multiple nodes in a system that includes a coordinator node and a worker node. The worker node sends the coordinator node a precommit notification associated with a write operation at the worker node. The coordinator node increments a global synchronization token maintained by the coordinator node and assigns the incremented global synchronization token as a commit ID for the database write operation. The commit ID for the database write operation is sent to the worker node. The worker node assigns the commit ID to the database write operation at the worker node and marks the write operation as committed. In a particular implementation, after the worker node sends the coordinator node the precommit notification, the worker node stores the write operation in persistent storage, such as in a write log. For example, the worker node may store the write operation without waiting to receive the commit ID for the transaction from the coordinator node.

In further implementations, the coordinator node precommits the write operation at the coordinator node using the commit ID and commits the write transaction after receiving a communication from the worker node that the worker node assigned a commit ID to the write transaction. The coordinator node sends a communication, such as an asynchronous communication, to the worker node to commit the transaction at the worker node.

As described herein, a variety of other features and advantages can be incorporated into the technologies as desired.

DETAILED DESCRIPTION

Example 1—Overview

Figure 1:
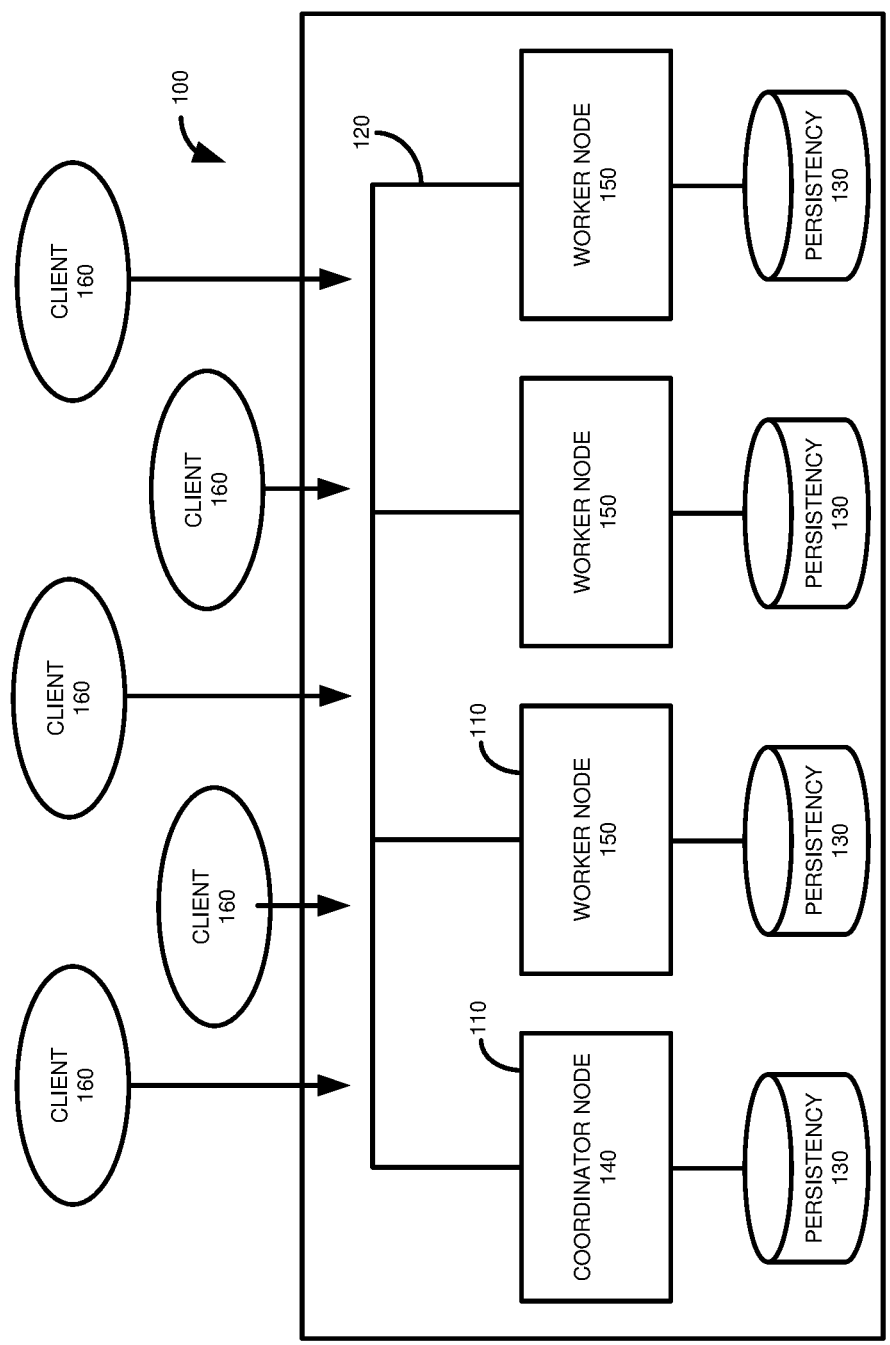
FIG. 1 is a diagram depicting a database environment having a coordinator node and a plurality of worker nodes in which at least certain implementations of a disclosed distributed transaction protocol may be used.

Database systems are increasingly designed and optimized for memory-centric, massively-parallel data processing, not only in single database systems, but also in multi-host distributed database systems. Partitioning and distributing a database into multiple hosts is a desirable feature especially for high-performance in-memory database systems, because it can leverage larger in-memory database spaces and a higher number of CPU cores beyond the limitations of a single physical machine (also referred to as a host, or node). For example, by partitioning and distributing large and fast growing fact tables over multiple hosts while replicating infrequently-updated dimension tables in a data warehouse system, or by partitioning a multi-tenant database into multiple hosts by tenants, it is typically possible to handle larger databases and higher workloads.

However, it would be beneficial to have a distributed transaction protocol which can provide scalable transaction processing performance without sacrificing transactional consistency. One way of attempting to ensure full transactional consistency, as in a single node scenario, is to have a centralized transaction coordinator and synchronize all executed transactions with the coordinator. Unfortunately, such a protocol typically does not scale well in terms of performance due to frequent and expensive inter-node network communications between the coordinator and the worker nodes. Another way to attempt to ensure transactional consistency is to achieve high multi-node scalability by specifying the provided transactional consistency level for target application domains, mostly by weakening the transactional consistency to some extent. This approach may not be acceptable for database systems where inconsistent transactions cannot be tolerated.

Particular embodiments of the present disclosure provide a distributed transaction protocol that can show scalable transaction processing performance in a distributed database system without compromising the transaction consistency typically used in snapshot isolation. In at least certain implementations of the disclosed distributed transaction protocol, a "snapshot" refers to view of the database system, or at least a portion thereof, as it existed at the time of the snapshot. For example, a query started under a particular snapshot would have available to it records as they existed at the time of the snapshot. The query would not see, for example, changes that were made to the records after the snapshot was acquired. In addition, in at least certain implementations, records are not removed if there is an open snapshot that will access them.

Snapshot isolation provides that all read operations in a transaction will see a consistent version, or snapshot, of the relevant database records. In terms of its performance, the disclosed distributed transaction protocol shows scalable transaction processing performance in distributed database systems by minimizing and optimizing inter-node transaction coordination.

The present disclosure can also provide a transaction consistency property, snapshot monotonicity, that can be used in systems along with ACID (atomicity, consistency, isolation, durability) properties. Snapshot monotonicity is related to snapshot isolation, and illustrates why the coordination in the disclosed transaction protocol can be beneficial.

Implementations of a transaction commit protocol are described in terms of sub operations in order to show how sub operations relate and interact in order to meet desired transaction consistency goals.

Certain embodiments of the present disclosure also provide practical optimizations that are exploited by the disclosed distributed transaction protocol. These optimizations include (a) reducing transaction commit latency by interleaving inter-node coordination network operations with log persistency I/O operations, (b) grouping and coalescing inter-node network I/O requests for better throughput, (c) performing lock-free transaction commit operations by exploiting the in-doubt transaction state of changed records, (d) reducing the latency of visibility decision operations by early pruning of invisible record versions using a precommit timestamp, and (e) reducing the latency of transaction commit operations by acknowledging earlier during multi-node transaction commit operations.

Example 2—Distributed Database Environment

This Example 2 describes an example distributed database system that may be used with at least certain embodiments of the disclosed distributed transaction protocol, and characteristics and consistency properties of example workloads. This Example also describes a particular implementation of snapshot isolation for use in an implementation of the disclosed distributed transaction protocol.

FIG. 1 illustrates a database environment 100 having a plurality of database nodes 110 connected through a network 120. In a particular example, the network 120 is a high-speed/low-latency network. A host refers to a computing system having a processor and memory. A host may also be referred to as a node. Unless the context clearly indicates otherwise, a node can refer to the host in a single host system (such a single worker node), or one of a plurality of hosts in a system (such as one of a plurality of worker nodes).

As shown, each node 110 has its own persistency store 130. In some examples, one or more nodes 110 may have shared storage. In a particular example, such as for disaster recovery purposes, a remote instance of the system 100 can be configured to act as a hot standby cluster by continuously replaying logs shipped from the primary cluster 100.

The database nodes 110 are asymmetric, in some respects, since database node 140 has the role of a coordinator node and database nodes 150 function as worker nodes. A coordinator node refers to a node (or host) that manages information regarding the coordinator node and one or more worker nodes. A worker node refers to a node that is installed on a different host than the coordinator node and has at least some of its activities or operations controlled or regulated by a coordinator node.

The coordinator node 140 and the worker nodes 150 are in communication, such as through the network 120, and may send and receive communications to and from one another. As used herein, the term "send" to a destination entity refers to any way of transmitting or otherwise conveying data within a computer system or between two computer systems, whether the data is directly conveyed or through one or more intermediate entities. Similarly, the term "receive," such as to receive from a source entity, refers to the receipt of data within a computer system or between two computer systems, whether the data is received directly from the computer system of original transmission or received through one or more intermediate entities.

Although the coordinator node 140 stores tables and partitions, the specific role of the coordinator node 140 is to act as a metadata master and a transaction coordinator for distributed transactions. For example, when a client 160 seeks to access metadata at a worker node 150, the worker node retrieves the corresponding metadata from the coordinator node 140 and caches it locally. The cached metadata for a specific database object will be valid until the next DDL (data definition language) transaction is committed for that particular database object. Furthermore, being the transaction coordinator, the coordinator node 140 decides about the commit of multi-node write transactions and mediates between the worker nodes 150 when they need to exchange transactional information with each other.

The database nodes 110 are symmetric, in other respects, as each node 110 has its own persistency store 130 for log and checkpoint files. From the perspective of a client 160, an application may connect to any of the database nodes 110 and execute arbitrary read and write transactions. Tables can be partitioned and distributed across multiple database nodes 110. If a table has partitions defined via hash or range predicates, then those partitions can be distributed and stored in different nodes 110.

Although a client 160 may connect to any of the database nodes 110, it could be sub-optimal to connect to one of them randomly, or in a round-robin fashion, because the query's required tables or partitions may reside in a node 110 different from its connected execution node 110. If a query's target database objects are located in a different node 110, then the query execution may need to involve node-to-node communication through the network 120, which can be expensive in terms of the delay and resources involved. To minimize this mismatch between the execution location and the data location, a number of strategies can be used in the system 100.

Client-side routing is one strategy that can be used to reduce delay and use of other resources. When a given query is compiled (e.g. prepareStatement( ) in the Java Database Connectivity (JDBC) API), its desired locations are cached at the database client library. The next execution of the compiled query (e.g. executePrepared( ) in JDBC) is then, transparently for the application, routed, such as being directly routed, to one of the desired locations. If a query's target table is partitioned and distributed, a single desired location of the query typically cannot be decided at query compilation time, but it can be decided at query execution time by evaluating the given arguments corresponding to the table's partitioning specification.

While client-side statement routing is an approach that changes the execution location to resolve the execution/data location mismatch, it is also possible to change the data location by moving tables or partitions into a different location. The relocation may be triggered by the database administrator or automatically by an advisor tool, such as based on monitoring statistics of a given workload. Alternatively, tables can be co-partitioned in view of particular workload or database schemas in order to avoid expensive multi-node joins.

It is also possible to resolve the execution/data location mismatch by selectively replicating or caching tables/partitions. For example, if a join between two tables reflects a typical query pattern, replicating or caching the less-update-intensive table, or the smaller table, or both at a node, may improve system performance.

The disclosed distributed transaction protocol can provide strong transaction consistency, which can be particularly useful for applications where weakened consistency would not be desirable. In at least some implementations, the disclosed transaction protocol can comply with ACID properties and provide the same, or at least substantially the same, transactional consistency independently of whether the underlying database is distributed or not.

Regarding the property isolation of the four properties in ACID, at least some database environments of the present disclosure can provide one or both of two variants of snapshot isolation, statement-level snapshot isolation (SSI) and transaction-level snapshot isolation (TSI). Snapshot isolation provides non-blocking read access against any concurrent write transactions.

If a transaction consists of one or more statements (such as data manipulation language, or DML, statements), which can be, for example, either of read and write (e.g. INSERT, UPDATE, or DELETE), in SSI, each statement reads data from a snapshot of the committed data at the time the statement started. In TSI, each transaction reads data from a snapshot of the committed data at the time the transaction started, called the snapshot timestamp. In at least some database environments, SSI and TSI can co-exist, such as being configurable on a per user connection. The definitions of SSI and TSI imply that data once read, in a statement or a transaction respectively, should be visible again within the same statement or transaction even though the data has been changed by a different concurrent transaction. For example, when executing a join query with some predicate, the same record can be visited multiple times within a single statement scope since the intermediate result of a query operator can be passed to the next query operator by a set of references to the filtered records (e.g. row IDs) without necessarily fully materializing them.

Although a Write Skew anomaly can happen under snapshot isolation, where two transactions concurrently read overlapping data, make disjoint updates, and commit, it typically can be avoided in practice by using SELECT FOR UPDATE properly in applications. Contrasted to other concurrency control options like optimistic concurrency control or two-phase locking, a benefit of snapshot isolation is that read queries can proceed without any query abort or any lock waiting situation, even though they read a database object which is being changed by other transactions.

In some implementations, the disclosed distributed transaction protocol can have additional characteristics. For example, the protocol can provide improved performance for both read-oriented workloads and read/write-mixed workloads. Although optimistic concurrency control can perform acceptably for some read-oriented workloads, it can lead to a high abort ratio for applications which generate concurrent read and write transactions.

Typically, in SSI and TSI, a snapshot timestamp is assigned to a new snapshot when the new snapshot starts. Under SSI, each statement has its own snapshot, while each transaction has its own snapshot under TSI. The cost of the snapshot timestamp assignment operation typically becomes more significant in SSI than in TSI, because the snapshot timestamp is assigned for each transaction under TSI, but for each statement under SSI. SSI thus offers more room for optimizations within the database kernel, because it can be known which tables or partitions need to be accessed in that particular snapshot scope by looking up the statement's query plan before actually executing it.

Another characteristic is that the cost of transaction control operations, such as snapshot timestamp assignment or transaction commit, may become more important for local statements/transactions than multi-node global statements/transactions due to their relative impact on overall performance. When a query touches tables distributed to multiple nodes, the query's execution time involves the network cost of exchanging the intermediate execution result of a node, thus the increase in the transaction control operations could be relatively trivial. However, if a query does not need to involve any network interaction for its own query processing, then a network roundtrip added only for the transaction control operation, for example, can affect the overall performance significantly. Typically, a large fraction of simple, but highly concurrent, queries (as typically observed in OLTP applications), run as single-node local queries. For example, in a multi-tenant database, tables can be partitioned reasonably well by tenant ID, leading naturally to node-local query execution.

In some aspects of the present disclosure, a database environment includes a table having database records. A new version of a record is created on each update operation instead of overriding the existing record version. Even for record deletion operations, a new version header is typically created with an empty payload instead of deleting the existing record right away. When creating a new record version, a versioning token, such as a version timestamp, representing the version creation time, is stored, such as in a version header. In a particular implementation, the version timestamp is derived from a global synchronization token, such as a transaction commit timestamp, maintained by a central transaction manager (which may be, for example, the coordinator node 140 of FIG. 1) which will be incremented on each commit of a write transaction. According to a particular example, the versions of a single record are chained to each other in a sorted order, such as by their version timestamps. Older versions in the version chain can be garbage-collected when specified criteria are met, such as when it is determined that there is no potential reader in the system for that record version. In a particular implementation, there being no potential reader in the system can be detected by maintaining a minimum value of snapshot timestamps of active snapshots in the system and comparing it with the version timestamps of the garbage candidates.

When a query tries to read a record version, the visibility of the record is checked by comparing the query's snapshot timestamp with the version timestamp of the candidate record version. If the version timestamp of the record is higher than the snapshot timestamp of the query, the particular record version should typically not be visible to the query because the created version of the record was committed after the query started. Otherwise, if the version timestamp of the record is not higher than the snapshot timestamp of the query, the record version should typically be visible to the query.

One potential issue in snapshot isolation implementation is updating version timestamps of multiple different rows in a transaction with the transaction's assigned commit timestamp in an atomic way. At version creation time, the embracing version timestamp can typically be correctly and finally set only after the embracing write transaction receives its commit timestamp within the commit procedure. However, if the versions of the write transactions are updated with their commit timestamp one by one, then some of those versions could be visible to another snapshot while the others might still be invisible. Such an outcome would not fully comply with the atomicity rule in the ACID properties.

To avoid this potential anomaly concerning visibility atomicity, a transaction context is maintained for each write transaction. When a write transaction starts its first write operation, a transaction context entry is created. In a particular example, all created row versions store a pointer to the transaction context entry in their version header field. At commit time, the transaction context entry is updated with the write transaction's commit timestamp, and thus is available to the other versions through the pointer to the transaction context entry. After the transaction commit processing is completed, the commit timestamp written in the transaction context entry is asynchronously propagated to the version timestamp fields. The transaction context entry may then be garbage-collected. With this atomic indirect commit timestamp assignment to the created versions, visibility atomicity is still facilitated under this snapshot isolation implementation.

Figure 2:
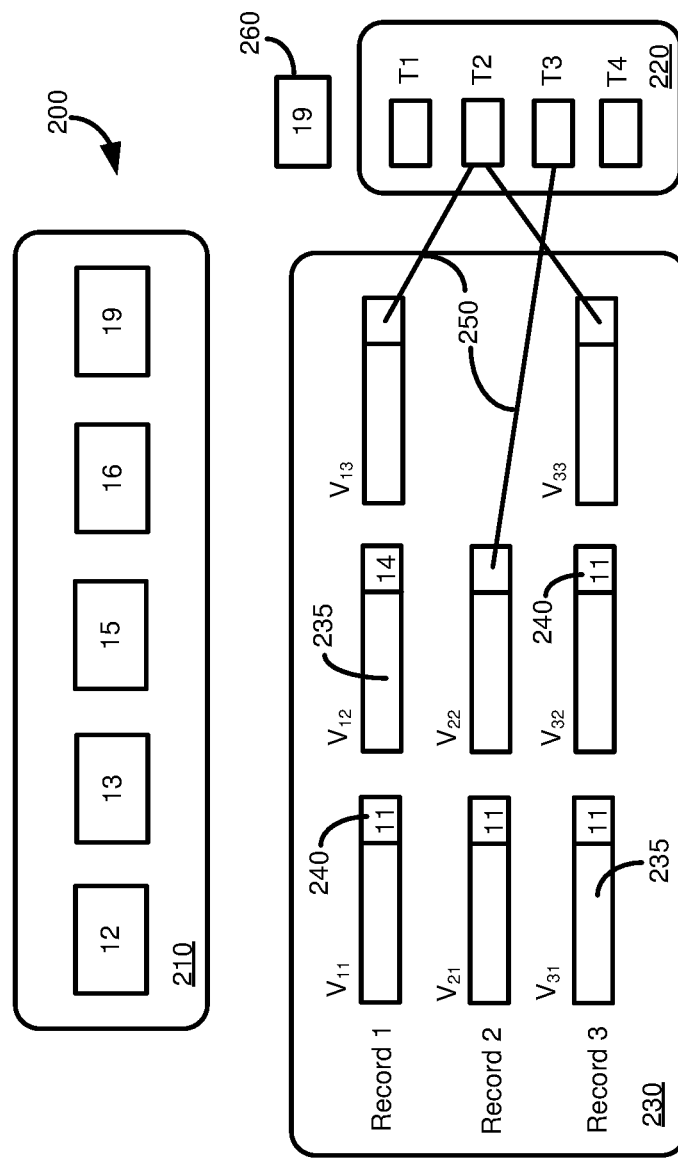
FIG. 2 is a diagram depicting an architecture of a transaction context providing version space management that may be used in at least certain implementations of a disclosed distributed transaction protocol.

FIG. 2 depicts an architecture 200 illustrating a transaction context providing version space management. The architecture 200 includes a snapshot timestamp store 210 that stores five active timestamps 12, 13, 15, 16, and 19. Architecture 200 further includes a transaction context store 220 for four active write transactions, T1, T2, T3, T4, each with their own transaction context entry. A record store 230 chain store holds three database records, Record 1, Record 2, and Record 3, each with own version chain of record versions 235. Each record version 235 includes a version timestamp 240.

As shown, from the viewpoint of a snapshot whose snapshot timestamp is 12, $V_{11}$ and $V_{21}$ are visible (because their version timestamps are less than the snapshot timestamp) but the other record versions 235 are not. $V_{13}$, $V_{22}$, and $V_{33}$ do not have their version timestamps yet, because their write transactions are not yet committed. Under this transaction state, the record versions 235 store a pointer 250 to the corresponding transaction context entries ($T_2$ and $T_3$). Once $T_2$, for example, commits, then the transaction commit timestamp (19, as shown) of the transaction manager 260 at that time is copied to the transaction context entry 220, thus providing visibility atomicity indirectly. Note that the data structures in FIG. 2 are provided to give a conceptual overview, but their actual implementation can be different. For example, depending on whether the corresponding table is a row store or a column store, both of which may be supported in a single database system, the storage layout of the record versions may be different.

Although read statements do not acquire locks in at least certain implementations of the present disclosure, a write transaction typically acquires an exclusive lock of its updated record to ensure a serializable schedule of concurrent write operations. If the latest version of the record is not visible to the snapshot after the exclusive record lock is acquired, then a transaction under TSI may throw an error to the end user. A statement under SSI, however, may be configured to restart the statement by substituting its statement timestamp with a newer value of the transaction commit timestamp. In at least certain examples, database objects are finally updated after lock acquisition and validation. In further examples, lock tables are partitioned according to the location of their corresponding tables, or partitioned together with a multi-node deadlock detection implementation, to detect when dependencies between write operations carried out at different nodes prevent transaction commitment.

Example 3—Distributed Snapshot Isolation

This Example 3 describes situations that can arise in distributed transaction processing, and also describes aspects of the present disclosure that may be used in addressing such situations. Table 1 provides a set of symbols that may be used to describe a distributed transaction protocol.

TABLE 1

| Notations | |
| --- | --- |
| Symbol | Description |
| CTS | Transaction commit timestamp of a transaction manager, incremented when a write transaction commits |
| GCT | CTS at the coordinator node |
| $LCT_i$ | CTS at a worker node i |
| $CID(T_i)$ | Commit ID of a write transaction $T_i$, assigned from GCT or LCT when $T_i$ commits |
| $pCID(T_i)$ | Precommit ID of a write transaction $T_i$, assigned from GCT or LCT when $T_i$ pre-commits |
| $Status(T_i)$ | Status of a write transaction $T_i$, either of {Unused, Active, Precommitted, Committed, Aborted} |
| $TID(T_1)$ | Transaction identifier of a transaction $T_i$ |
| $STS(Si)$ | Snapshot timestamp of a snapshot $S_i$, assigned from GCT or LCT when the snapshot (statement or transaction) starts |

In at least certain implementations, the disclosed distributed transaction protocol can provide the same level of transactional consistency regardless of how many nodes the database is partitioned into. For example, a database environment may evolve from a single-node system to a multi-node distributed system, such as to handle higher workloads or larger database volumes. It may be undesirable for users to change their own application logic and adapt it for a potentially weaker consistency level provided by the database engine. This Example 3 describes two consistency properties of distributed database environments that can be addressed by at least certain distributed transaction protocols of the present disclosure.

According to the principle of visibility atomicity, a transaction's changes should be visible to another concurrent snapshot in an atomic way: either completely visible or not. Achieving visibility atomicity under snapshot isolation in a distributed database environment can be difficult because the record versions created by a write transaction can be distributed across worker nodes. For example, for a multi-node write transaction, if each updated node is committed one by one, then the changes of a node can be visible earlier to another concurrent reader, but others may not be visible to the same reader.

Figure 3:
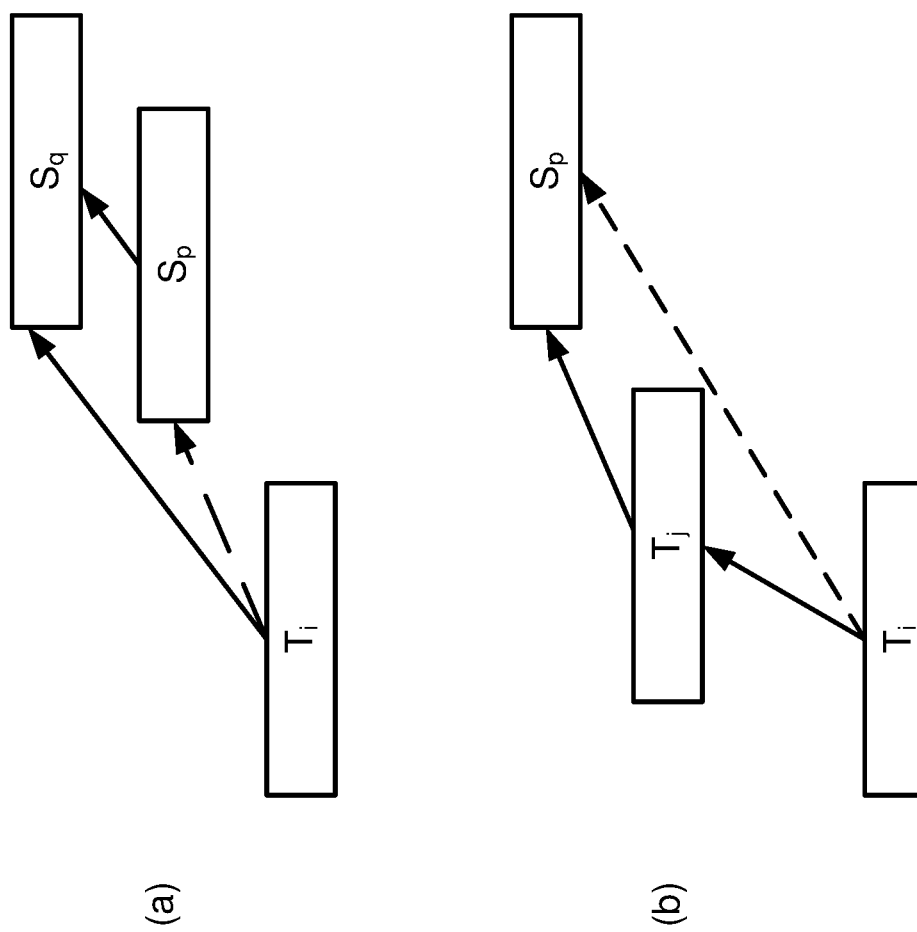
FIG. 3 is a diagram illustrating properties of snapshot monotonicity that may be provided by at least certain implementations of a disclosed distributed transaction protocol with reference to an arbitrary pair of snapshots and an arbitrary pair of write transactions.

According to the principle of snapshot monotonicity, a transaction protocol is said to ensure snapshot monotonicity if all of the following conditions (visually represented in FIG. 3) are met for an arbitrary pair of write transactions, $T_i$ and $T_j$, and an arbitrary pair of snapshots, $S_p$ and $S_q$:
  If $T_i$'s changes were visible to $S_q$, and $S_q$ was started after $S_p$'s start, then $T_i$'s changes should be visible to $S_p$ as well (FIG. 3(a)).
  If $T_j$'s changes were visible to $S_p$, and $T_j$ committed after $T_i$'s commit, then $T_i$'s changes should be visible to $S_p$ as well (FIG. 3(b)).

Snapshot monotonicity is not represented by traditional ACID property definitions. However, it is a feature that may be appreciated by users. For example, assume a SalesOrder processing component in a business application inserted a record into a database table Tab1 by using a transaction $T_1$, and then it notified the event to a SupplyAvailabilityCheck processing component via a messaging protocol inside an application server after $T_1$ is committed. The SupplyAvailabilityCheck processing component then inserts a new record into a table Tab2 by using another transaction $T_2$. Then, it will be expected that the inserted record by SalesOrder processing (into Tab1 by $T_1$) should be visible to an analytic query which joins the tables Tab1 and Tab2 if the inserted record by SupplyAvailabilityCheck processing (into Tab2 by $T_2$) was visible to the join query.

Although previous approaches have sought to address the desired transaction consistency requirements, they typically suffer from disadvantages, as will be described. One approach is to use a central coordinator node for processing all types of transaction events to help ensure full coordination of transactions. Whenever a write transaction commits at the coordinator, or any of the worker nodes, it increments a global transaction commit timestamp maintained by the central transaction coordinator. Every snapshot starting at any worker node also acquires its snapshot timestamp by accessing the coordinator node. Thus, all multi-node and single-node transactions and snapshots are synchronized by the central coordinator node.

In this approach, even single-node local queries, which can be executed at a single worker node, require a network round trip to the coordinator node. In terms of performance, it is typically not desirable because the query's latency increases and the coordinator node may become a potential bottleneck with a large number of worker nodes.

As another potential solution, in a vectorized approach, a fully localized transaction model may be used where every worker node has its own local transaction manager and each local transaction manager maintains its own local commit timestamp (LCT). Whenever a write transaction commits, it increments its transaction manager's local commit timestamp. Starting a local snapshot at a worker node, a snapshot timestamp (STS) is acquired from the local transaction commit timestamp of the worker node. When a multi-node snapshot starts, it collects snapshot timestamps from the worker nodes that it can potentially access during its snapshot and carries the collected snapshot timestamp in a vector during its query execution.

This approach can impose a significant performance penalty on multi-node queries. First, the cost of a multi-node access query is high because snapshot timestamps from multiple worker nodes that the query can potentially access during its snapshot are collected. If the worker nodes to be accessed are not known a priori, this cost becomes even higher because the query may need to collect the snapshot timestamps from all available worker nodes.

Second, acquiring snapshot timestamps from query target nodes should be atomic against any concurrent write transactions, and thus even the read operation may lead to expensive synchronization across multiple nodes. An example of such a situation is illustrated by the system 400 shown in FIG. 4. System 400 includes a first node 410 having an execution timeline 415 and a second node 420 having an execution timeline 425. Node 410 has an initial local commit timestamp of 10, while node 420 has a local commit timestamp of 20.

A multi-node query, $S_1$, accesses tables at node 410 and node 420. At process block 430, when $S_1$ accesses node 410, the query is assigned a snapshot ID, such as a timestamp, from the LCT maintained by node 410. In this case, the STS assigned by 410 is 10.

A write transaction $T_1$ accesses tables maintained at node 410 and node 420. When the write transaction executes on node 410, at process block 435, $LCT_1$ increments to 11, which is also the value assigned to the commit ID (CID) for $T_1$ at node 410. When write transaction $T_1$ executes at node 420, at block 440, $LCT_2$ increments to 21, which is also the value assigned to the CID for $T_2$ at node 420. After execution at nodes 410, 420, $T_1$ has a vector that includes the CIDs obtained from each node: {11, 21}. Query $S_1$ then executes on node 420 at process block 445.

Note that $S_1$ executes before $T_1$ on node 410, but after $T_1$ on node 420. Thus, while $S_1$ has a vector of {10, 21}, $T_1$ has a vector of {11, 21}. If there is no synchronization during the step of collecting snapshot timestamps from nodes 410, 420, a part (changes at node 420) of a write transaction $T_1$ is visible to a multi-node query $S_1$ (STS($S_1$), as 21 is higher than or equal to CID($T_1$), 21 at node 420). However, the changes at node 410 are not visible to $S_1$, as the snapshot timestamp $S_1$ at node 410, 10, is less than the commit ID of $T_1$, 11 at node 410. As the write operations within a transaction should be either all visible or all not visibility, this scenario violates visibility atomicity.

The incremental snapshot timestamp scheme is an optimized variant of the vectorized approach. The incremental snapshot timestamp scheme does not acquire the snapshot timestamps when a snapshot starts, but rather acquires them on demand incrementally. In this approach, the visibility atomicity issue described in conjunction with FIG. 4 can be more problematic because of a wider time gap between the snapshot timestamp acquisition at node 410 and snapshot timestamp acquisition at node 420 for a query which accesses both of them.

To attempt to resolve this visibility atomicity issue, the incremental approach maintains a mapping between consistent snapshot timestamp values of different worker nodes by requiring that every multi-node write transaction update the mapping information. The representation of the mapping information is simplified by using the global commit timestamp, which is incremented on every multi-node write transaction's commit so that the mapping information contains only a pair of a global snapshot timestamp value and a local snapshot timestamp value. Although this approach can help address the visibility atomicity issue discussed in conjunction with FIG. 4, it can have undesirable features.

For example, the existence of multi-node write transactions adds high cost to a system which has many concurrent, local read queries, because the multi-node write transaction accesses all running local snapshots to update its mapping information between the global snapshot timestamp and its local snapshot timestamp. In addition, snapshot monotonicity is not fully ensured because local write transactions are not synchronized with each other at all.

Figure 4:
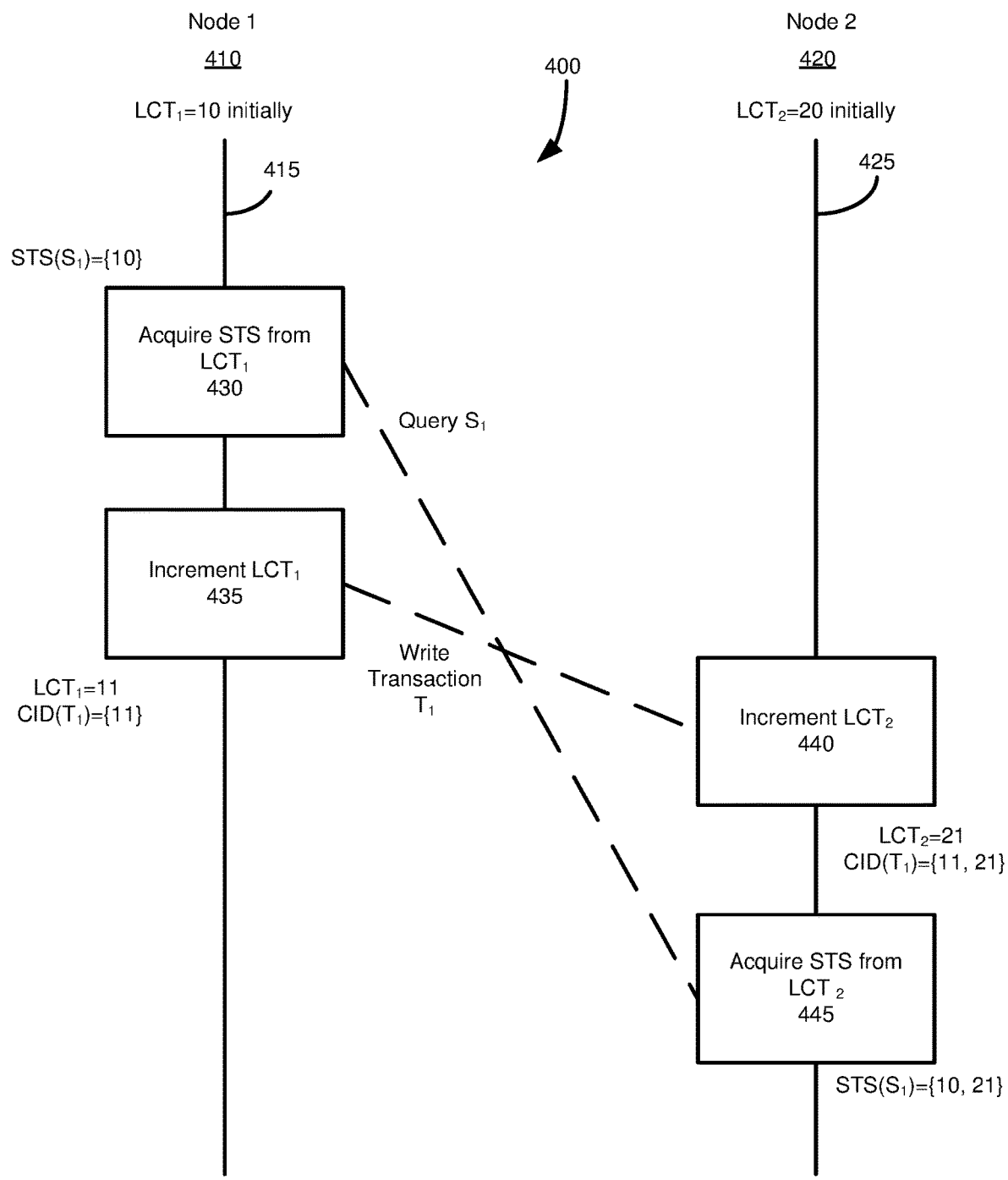
FIG. 4 is a diagram illustrating operations occurring at first and second nodes in a distributed database environment using vectorized transaction coordination.
Figure 5:
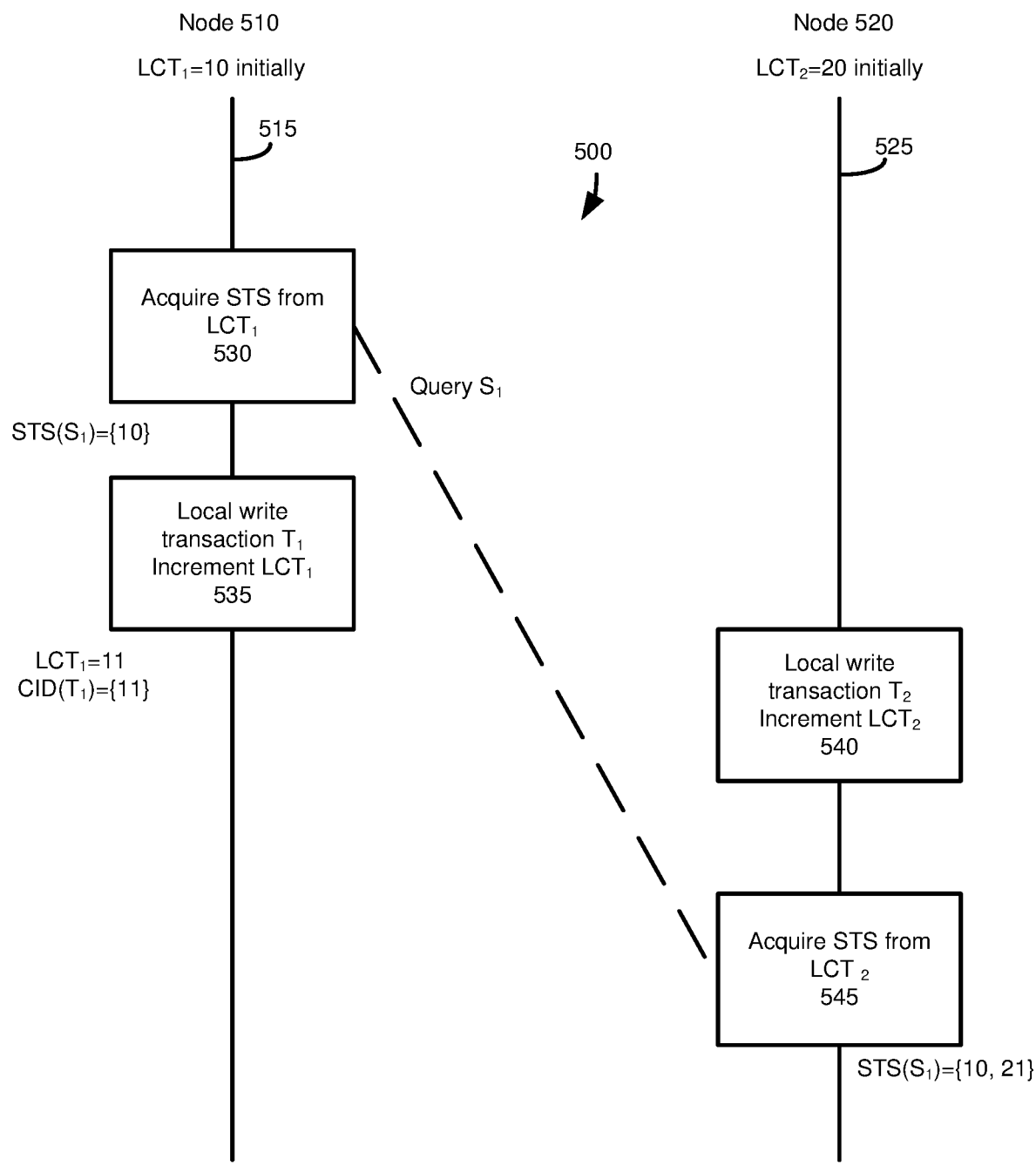
FIG. 5 is a diagram illustrating operations occurring at first and second nodes in a distributed database environment using incremental snapshot timestamp transaction coordination.

FIG. 5 illustrates a system 500 that is similar to the system 400 of FIG. 4. System 500 includes a first node 510 having an execution timeline 515 and a second node 520 having an execution timeline 525. A query $S_1$ accesses nodes 510 and 520. $S_1$ acquires a snapshot ID, such as a timestamp, from node 510 in process 530. Node 510 has an initial $LCT_1$ value of 10, which is assigned as the STS of $S_1$ at node 510. A local write transaction $T_1$ executes on node 510, at block 535, after the search acquires its STS from $LCT_1$. The LCT of node 510 increments from 10 to 11 in block 535, which value is assigned as the commit ID of $T_1$ on node 510.

Node 520 has an initial $LCT_2$ value of 20. Write transaction $T_2$ executes on node 520 at block 540, incrementing the LCT of node 520 to 21, which value is assigned as the commit ID of $T_2$ on node 520. In block 545, $S_1$ acquires a snapshot ID from node 520, and is assigned a STS of 21. Thus, local write transaction $T_2$ executes on node 520 before the search acquires its STS from $LCT_2$.

As seen in FIG. 5, $T_1$'s change will not be visible to $S_1$, as the STS of 10 for $S_1$ is less than the CID of 11 for $T_1$. However, because $S_1$ acquires a STS of 21 from node 520, and that is equal to or greater than the CID for $T_2$, 21, on node 520, $T_2$'s change will be visible to $S_1$. So, as described above, in the particular case that $T_2$ was committed after $T_1$ with some implicit causal dependency at the application server side, it violates the requirement of snapshot monotonicity, even if it does not violate visibility atomicity (because there are two different, local write operations, rather than a single, multi-node transaction as in FIG. 4). If the causal dependency between two local transactions is explicitly exposed to the database engine (e.g. in case of a trigger), it may be possible to capture such dependencies automatically and interpret the two local transactions as a single global transaction. However, it typically cannot be expected that all the causal dependencies of two different local transactions are explicitly exposed by the application server.

The incremental STS assignment technique also may lead to a visibility anomaly under existing version garbage collection, or potentially a high performance penalty in avoiding the anomaly and providing correct version garbage collection. As opposed to the vectorized approach, which collects the needed snapshot timestamps at the time of snapshot start, the incremental snapshot assignment approach accesses the execution node later than its start time. Since non-local nodes are not aware of such multi-node queries, the versions needed for the query might already have been already garbage-collected. In this case, even though the right local snapshot timestamp is assigned, the needed versions may no longer be available, and thus the query may abort.

Yet another potential drawback of the incremental approach is the possibility of multi-node queries being aborted due to a mismatch of local mapping information among the nodes accessed by a query. This is because, in some cases, a given global snapshot timestamp cannot be always correctly translated to the correct local snapshot timestamp.

In at least certain implementations, the disclosed distributed transaction protocol can provide transaction consistency equivalent to a single-node system, or a multi-node setup under the full coordination model, including visibility atomicity and snapshot monotonicity, without adding a significant performance penalty. In specific implementations, the disclosed distributed transaction protocol maintains a local commit timestamp for each worker node and also maintains a global commit timestamp. The global commit timestamp is synchronized with the local commit timestamps whenever a multi-node write transaction commits, as well as when a local write transaction commits Thus, all write transactions, including local write transactions, are ordered.

The disclosed protocol, in some aspects, includes a synchronous network round trip for each local write transaction. At least certain examples of the disclosed protocol optimize this network synchronization. For example, the latency overhead may be almost hidden by overlapping the network I/O with the log persistency I/O used for the commit operation. For durability, even local write transactions typically write redo logs and flush them to a persistent storage synchronously before finishing the commit In addition, network I/O requests from concurrent write transactions may be grouped together and collectively sent through a single network roundtrip, which can help reduce any impact on performance throughput.

For visibility atomicity of multi-node write transactions, certain aspects of the present disclosure provide a delayed visibility decision scheme that employs an in-doubt visibility state of record versions. The visibility in-doubt state means that the write transaction of the target record versions started its commit processing but is not yet finished. Under this state, the visibility to a given snapshot is not immediately decided, but postponed until the transaction state is marked as committed. The in-doubt state results in the sub-operations being effectively atomic without relying on any latch or lock.

Example 4—Snapshot Management

This Example 4 describes how a snapshot timestamp (STS) is assigned to a snapshot (a statement under SSI or a transaction under TSI), how the STS is used for a visibility decision by the snapshot, and how the garbage versions are detected based on STS values. Although this Example 4 generally describes the protocol being used with SSI, the protocol can be applied in other contexts, including under TSI.

Figure 6:
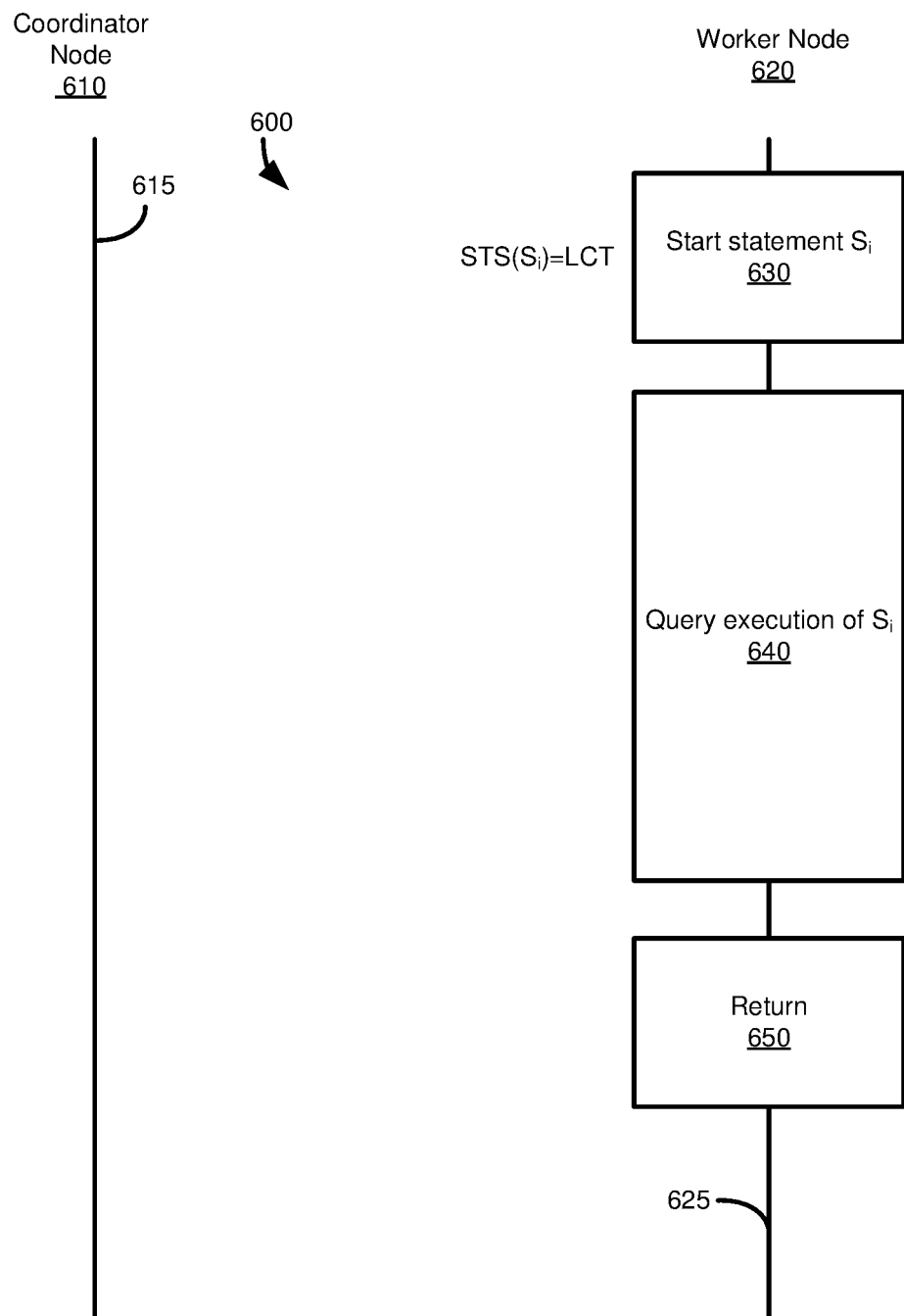
FIG. 6 is a diagram illustrating operations occurring at a coordinator node and a worker node for a local snapshot of the worker node using at least certain implementations of a disclosed distributed transaction protocol.

FIG. 6 illustrates a system 600 illustrating how a STS is assigned to a local statement. The system 600 includes a coordinator node 610 with an execution timeline 615 and a worker node 620 with an execution line 625. When a statement, $S_i$, starts in block 630, it gets its STS from its local synchronization token (such as a local commit timestamp (LCT)) maintained at worker node 620, not from the global synchronization token (such as a global commit timestamp (GCT)) maintained by the coordinator node 610. This is possible because the LCT of the worker node 620 is synchronized with the GCT maintained by the coordinator node 610 whenever a write transaction commits in the worker node 620. Throughout the statement execution, block 640, the same STS value is used to determine the visibility of a candidate record version. At operation 650, the worker node 620 returns query results to the database client which initiated the query.

Figure 7:
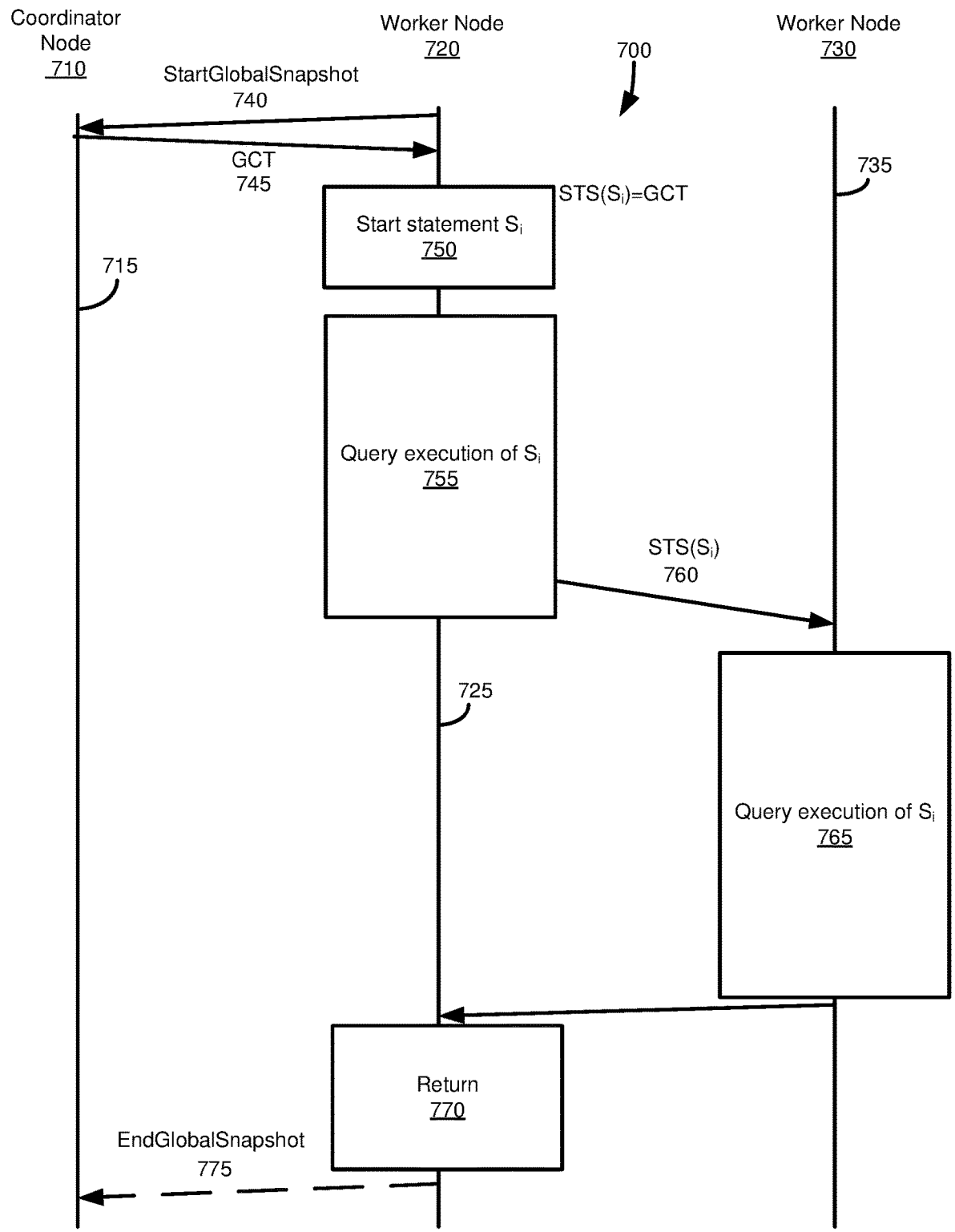
FIG. 7 is a diagram illustrating operations occurring at a coordinator node and first and second worker nodes for a global snapshot, under which statements at each of the first and second worker nodes are executed, using at least certain implementations of a disclosed distributed transaction protocol.

FIG. 7 illustrates a system 700 depicting STS assignment of a multi-node statement executable at worker nodes 720, 730 having respective execution timelines 725, 735. Execution of the statement $S_i$ is facilitated by a coordinator node 710 having an execution timeline 715. To provide visibility atomicity across multiple worker nodes 720, 730, the statement timestamp is acquired at worker node 720 from the coordinator node 710 by the worker node 720 sending a StartGlobalSnapshot request 740 to the coordinator node 710 for a global synchronization token maintained by the coordinator node. The STS (corresponding to the synchronization token, such as the GCT) assigned by the coordinator node 710 is sent to the worker node 720 in communication 745 and can be used for transactional access to any node, because all the worker-side transaction commit operations inform the coordinator node 710 synchronously during their commit operations.

In at least certain implementations of the present disclosure, "maintaining" a token includes generating the token and assuming responsibility for the correctness of the token. For example, a coordinator node may be responsible for generating a global timestamp and incrementing it as appropriate to reflect the correct state of a database system. "Sending a token" or "receiving a token," in at least certain implementations, refers to sending or receiving, respectively, the current value of the token.

In particular implementations of the systems of FIGS. 6 and 7, the snapshot ID is an integer, such as an eight byte integer. In a specific example, the snapshot ID is derived from, or the same as, the LCT (which, if the node 410 is a coordinator node, is the global commit timestamp (GCT)).

After receiving the STS, the STS is assigned to the statement $S_i$ in block 750, which then executes in block 755. The statement $S_i$ carries the assigned STS, such as in communication 760, when it needs to be executed in another worker node, such as worker node 730, throughout its statement execution (as shown in block 765 for worker node 730). At the end of the statement execution, such as in return block 770 of execution timeline 725, an asynchronous request is made to the coordinator node 710 by the worker node 720 using EndGlobalSnapshot request 775, which can be used, for example, for garbage collection purposes.

Making a synchronous network I/O to the coordinator to receive the global STS adds an additional cost (in both time and resources) for a multi-node statement. As previously mentioned, this cost can be minimized by grouping the requests from concurrent global queries into a single network call, as explained further with reference to FIG. 12. However, since the multi-node statement itself already generates larger network traffic than getting a single STS value, the extra cost imposed by the global STS is typically not significant.

Under SSI, it can be decided at the statement start time whether a statement will use the local STS or the global STS. Using client-side statement routing, the target location information of a compiled query is already maintained. Before query execution, it can be determined whether the query will access only a single node or multiple nodes retrieved from a pre-compiled query plan. For queries whose target location cannot be determined at query compilation time (e.g. a query for a partitioned table not containing the partitioning key in its WHERE clause), in a particular implementation, the query is optimistically classified as a local query. If this decision turns out to be not correct, the query can be re-started by substituting the STS with the current GCT. Under SSI, such query restart can be done without necessarily returning any error to the client application.

Under TSI, a database environment operating an implementation of the disclosed distributed transaction protocol may be configured to mostly employ the global snapshot timestamp, as it may not be certain which types of statements will be executed within the transaction's life cycle. However, for cases where the transaction boundary is not particularly short, any performance penalty coming from access to the global STS is typically not significant because the global STS is typically accessed under TSI only when the transaction starts, not for every statement. In case of pre-compiled stored procedures, it can be detected earlier even under TSI whether the procedure will make a local execution or a multi-node execution by looking up the query plans of the statements to be executed in the procedure.

If node 620 fails while the query is executed in the scenario of FIG. 6, then the query is automatically aborted as the node 620 is restarted. In the scenario of FIG. 7, if node 730 fails while the query is executed at node 720, the query is restarted or aborted because the record versions corresponding to the query's assigned global STS might not be available any more in the restarted node 730. This case can be detected by maintaining a per-node watermark at each worker node 720, 730, which is incremented whenever the corresponding worker node 720, 730 is restarted. In a specific example, the watermark is a token, such as an integer. After a worker node is restarted, its watermark value is also cached at the coordinator node 710, and then the set of available per-node watermark values are transmitted jointly to a global query when the query gets the global STS value from the coordinator node. Therefore, in at least certain implementations of the disclosed distributed transaction protocol, the communication 745 from the coordinator node 710 to the worker node 720 includes at least the GCT and the watermark tokens cached at the coordinator node. Whenever the execution of a global query is shipped to a new worker node 720, 730, it is checked whether the worker node has the same watermark value as the query's informed watermark value.

Algorithm 1 shows how a statement checks if a record version V should be visible or not to a snapshot S (a statement under SSI or a transaction under TSI). For the visibility decision, first, V's creator transaction's state is checked. If it is aborted or active, then V should not be visible to S (lines 8 to 11). If it is committed, then V's CID is compared to STS(S). V is visible to S only if STS(S) is equal to or larger than V's CID (lines 3-7).

| Algorithm 1 Visibility decision algorithm: check if a record version V should be visible to a snapshot S or not |
| --- |
| 1: while TRUE do |
| 2:    if V's status is Committed then |
| 3:       if V's CID ≤ STS(S) then |
| 4:          return TRUE |
| 5:       else |
| 6:          return FALSE |
| 7:       end if |
| 8:    else if V's status is Aborted then |
| 9:       return FALSE |
| 10:    else if V's status is Active then |
| 11:       return FALSE |
| 12:    else if V's status is Precommitted then |
| 13:       if V's pCID ≥ STS(S) then |
| 14:          return FALSE |
| 15:       else |
| 16:          wait until V's status becomes Committed or Aborted |
| 17:       end if |
| 18:    end if |
| 19: end while |

In addition to the basic visibility rules, the following extensions are provided. As previously mentioned, and as recited in Algorithm 1, at least certain implementations provide a statement or transaction status of being precommitted, where the final commitment of the statement or transaction is treated as in-doubt, with the visibility decision being delayed until the in-doubt status has been resolved, such as by the statement or transaction being committed. If V's status is precommitted (lines 12 to 17), the corresponding record version's visibility decision is postponed. The precommitted/in-doubt state makes sub-operations of a transaction commit effectively atomic without relying on any latch or lock.

The delayed visibility decision scheme may result in a situation where a read statement may need to wait for another write transaction's commit to be completed. However, this waiting situation is typically uncommon, because it happens when a read statement is trying to check the visibility of a record version which was created by a write transaction committed at the same time as the read attempt. To further reduce the possibility of a reader waiting for an in-doubt transaction to complete, particular implementations of the disclosed transaction management protocol can include early pruning of record versions that will never be visible.

As explained above, the in-doubt period of a transaction is started by setting the transaction's state as precommitted. By assigning pCID, which is typically defined to be smaller than its CID value to be decided later, at the time when the transaction state is set as precommitted, record versions which will never be visible to the pending reader statement, such as because the query was started later than the write operations and thus should only view records that were available when the query was started, can be pruned. More specifically, if STS(S) is smaller than or equal to pCID(T) for a write transaction T and a snapshot S, then STS(S) will also be smaller than CID(T) because pCID(T) is smaller than CID(T) assigned by the commit protocol. Thus, if STS(S)≤pCID(T), it can be determined that the tested version V is not visible to S (lines 13 to 14 of Algorithm 1) without waiting any further.

In at least certain implementations of the present disclosure, garbage collection is executed independently in each worker node, but it considers not only the queries running in its local node, but also multi-node queries which were started at different worker nodes but can potentially access the local node. In order to reflect such global queries during local garbage collection, the coordinator node maintains all the active global queries by watching the incoming StartGlobalSnapshot calls and EndGlobalSnapshot calls. When local garbage collection starts at a worker node, it gets the minimum STS value of active global queries, called MinActiveGlobalSTS, from the coordinator node, and also the minimum STS value of its active local queries, called minActiveLocalSTS, from its local node. Taking the minimum value of MinActiveGlobalSTS and MinActiveLocalSTS, the garbage collector finds out the record versions that have version timestamps which are smaller than the minimum value by traversing the record version chains.

To maintain the complete set of active global queries at the coordinator, StartGlobalSnapshot should typically be executed synchronously from a worker node to the coordinator node. However, since StartGlobalSnapshot is already used to get the global STS of a global query, it does not add additional latency to the global query. In particular implementations of the disclosed method, the overhead of EndGlobalSnapshot is minimized by making it as an asynchronous call, as shown in FIG. 7. Although the asynchronous call can result in the MinActiveGlobalSTS value being slightly out of date, which can result in slightly delayed garbage collection, it does not typically otherwise affect the overall performance of transaction processing.

Figures 8A, 8B:
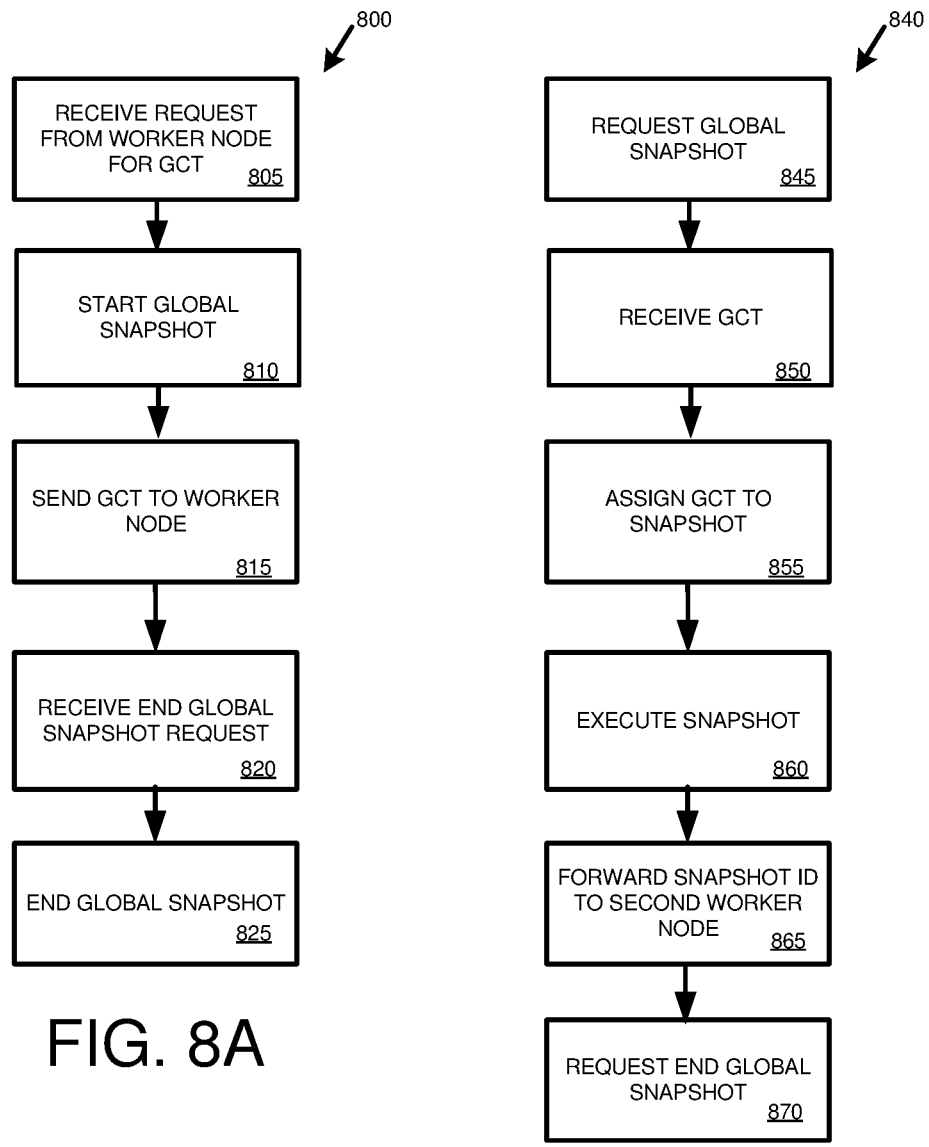
FIG. 8A is a flowchart of an example method summarizing actions occurring at a coordinator node during an embodiment of the present disclosure for managing snapshots.
FIG. 8B is a flowchart of an example method summarizing actions occurring at a worker node during an embodiment of the present disclosure for managing snapshots.

FIG. 8A presents a flowchart of a method 800 summarizing actions occurring at a coordinator node during an embodiment of the present disclosure facilitating snapshot isolation. In step 805, the coordinator node receives a request for a global commit ID, such as a global commit timestamp, maintained by the coordinator node. The coordinator node may send additional synchronization tokens, such as a watermark value cached at the coordinator node and associated with the status of the worker node, to the worker node.

The coordinator node starts a global snapshot associated with the request in step 810 and sends the global commit ID (and, optionally, the additional synchronization tokens, such as a watermark) to the worker node in step 815. In step 820, the coordinator node receives a notification from the worker node, such as asynchronously, to end the global snapshot associated with the request. The coordinator node ends the global snapshot associated with the request in step 825.

FIG. 8B presents a flowchart of a method 840 summarizing actions occurring at a first worker node during an embodiment of the present disclosure facilitating snapshot isolation. In step 845, the first worker node sends a request to the coordinator node to begin a global snapshot. The first worker node receives a response from the coordinator node, including a global synchronization token (such as a global commit ID, such as a GCT), in step 850. The first worker node may request and receive additional synchronization tokens, such as a watermark value cached by the coordinator node and associated with the status of the first or second worker nodes. The first worker node assigns the GCT to the snapshot as a snapshot ID in step 855. In step 860, the first worker node executes the snapshot. The first worker node, in step 865, sends the snapshot ID to a second worker node. The second worker node may execute the snapshot using the snapshot ID obtained from the first worker node. The first worker node sends a request to the coordinator node to end the global snapshot, such as asynchronously, in step 870.

Example 5—Transaction Commit

Figure 9:
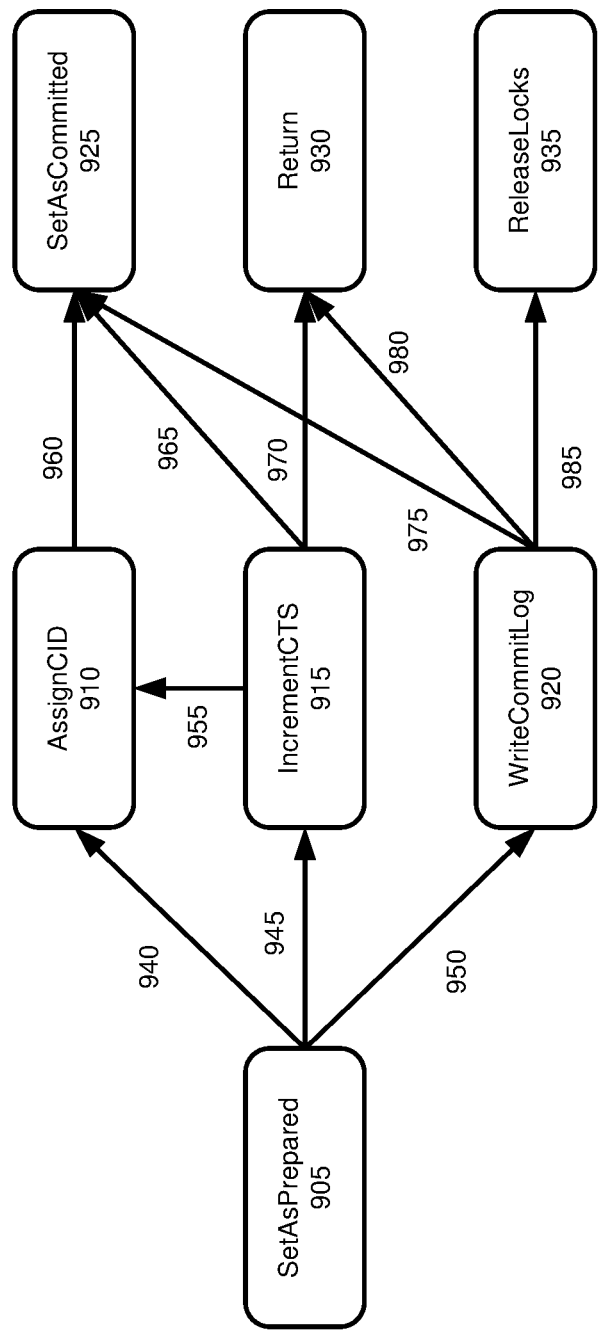
FIG. 9 is a diagram illustrating an operation ordering that may be used with a least certain implementations of a disclosed distributed transaction protocol.

This Example 5 describes a transaction commit protocol according to an embodiment of the present disclosure, which may have different implementations depending on the write transaction type. Commit protocols according to the embodiment of the present disclosure have a common set of sub-operations (Table 2) and employ the same ordering rules among those sub-operations (FIG. 9).

TABLE 2

Sub-operations of transaction commit

| ID | Description |
| --- | --- |
| SetAsPrepared | Set the transaction's status as precommitted |
| IncrementCTS | Increment GCT or LCT depending on where it commits |
| AssignCID | Assign the transaction its CID value and associate it with the transaction's created record versions |
| WriteCommitLog | Write the transaction's commit log to persistent storage |
| SetAsCommitted | Set the transaction's status as committed |
| ReleaseLocks | Release all the write locks acquired by the transaction |
| Return | Acknowledge the completion of the transaction's commit to the client which requested it |

A write transaction's status becomes precommitted by SetAsPrepared until SetAsCommitted is called later for the transaction. As previously mentioned, this in-doubt state can be used by the delayed visibility decision scheme to help ensure the atomicity of IncrementCTS and AssignCID of a write transaction without relying on any latching or locking during transaction commit processing. When IncrementCTS is called, GCT or LCT is incremented depending on which type of node it commits Based on the new GCT or LCT value, the transaction's CID is decided at AssignCID. When WriteCommitLog is called, the write transaction generates a commit log entry and writes it to persistent storage, then calls SetAsCommitted that sets the transaction's status as committed, and then calls ReleaseLocks, which releases all the write locks acquired by the transaction. If SetAsCommitted is finished, the write transaction's created record versions can be potentially visible to other readers. If ReleaseLocks is finished, then the write transaction's changed records can be potentially changed again by other writers. Note that, following the multi-version concurrency control approach, a write operation of a transaction acquires a write lock on the changed record, but read operations do not acquire any lock. Finally, at Return, the transaction's commit is acknowledged to the client which requested it.

Among those suboperations, a predefined execution order is typically maintained to help ensure transactional consistency, which is shown in FIG. 9. For operation boxes 905, 910, 915, 920, 925, 930, 935, arrows 940, 945, 950, 955, 960, 965, 970, 975, 980, 985 indicate that the operation at the tail end of the arrow should be executed before the operation at the head of the arrow.

The execution order 975, between WriteCommitLog 920 and SetAsCommitted 925, and the execution order 980 between WriteCommitLog 920 and Return 930, should typically be maintained in order to help provide snapshot monotonicity. Otherwise, snapshot monotonicity may not occur, because once visible data might not be visible any more after crash restart. Execution order 985, between WriteCommitLog 920 and ReleaseLocks 935, should also typically be maintained, as it provides two-phase locking. Otherwise, uncommitted data can be changed again by another transaction, potentially leading to a cascaded rollback problem.

Without maintaining execution order 960, between AssignCID 910 and SetAsCommitted 925, a record version that should be visible to a query may not be visible because the CID assignment to the record version is not yet finished. Without execution order 965, between IncrementCTS 915 and SetAsCommited 925, and execution order 970, between IncrementCTS 915 and Return 930, commit-marked or commit-informed data might not be visible even to its next query of the same session because the next query may start with a smaller snapshot timestamp value than the previously committed transaction's CID value.

Execution order 955, between IncrementCTS 915 and AssignCID 910, also helps provide snapshot isolation. For example, if IncrementCTS 915 is performed after AssignCID 910, a query that started before a write transaction T1's IncrementCTS 915 operation could see T1's changes later because the STS value assigned to the query could be identical to T1's CID value. SetAsPrepared 905 should typically be executed before WriteCommitLog 920 (transaction order 950) as well as before IncrementCTS 915 and AssignCID 910 (execution orders 945 and 940, respectively), since these two suboperations should be made effective for other transactions in an atomic way. For example, if IncrementCTS 915 is completed, but AssignCID 910 is not yet finished for a write transaction T1, then a different reader statement S1 can have STS(S1)>=CID(T1). However, since T1 does not yet have any CID, S1 can interpret T1's created versions as invisible but suddenly they will become visible when T1 finishes AssignCID, which will violate snapshot isolation.

Figure 10:
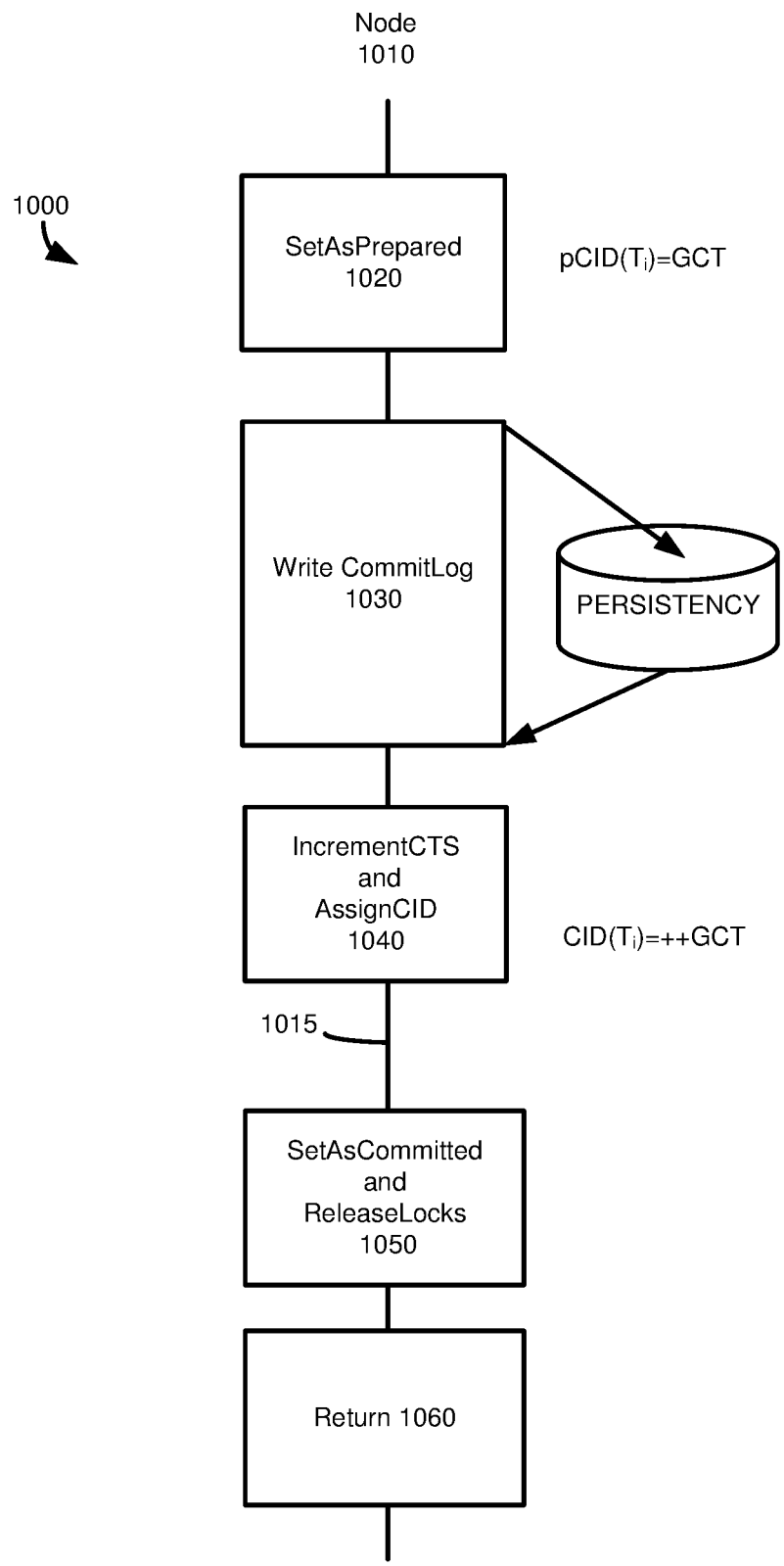
FIG. 10 is a diagram illustrating how a write transaction commits, using at least certain implementations of a disclosed distributed transaction protocol, when it has only updated tables at a coordinator node.

FIG. 10 depicts a system 1000 illustrating how a write transaction commits when it has updated only the tables in a coordinator node 1010 having an execution timeline 1015. The GCT is available locally in this scenario. The suboperations of the transaction commit are ordered as: SetAsPrepared 1020, WriteCommitLog 1030, Increment-CTS and AssignCID, 1040, SetAsCommitted and ReleaseLocks 1050, and Return 1060, which meets the ordering structure shown in FIG. 9.

Figure 11:
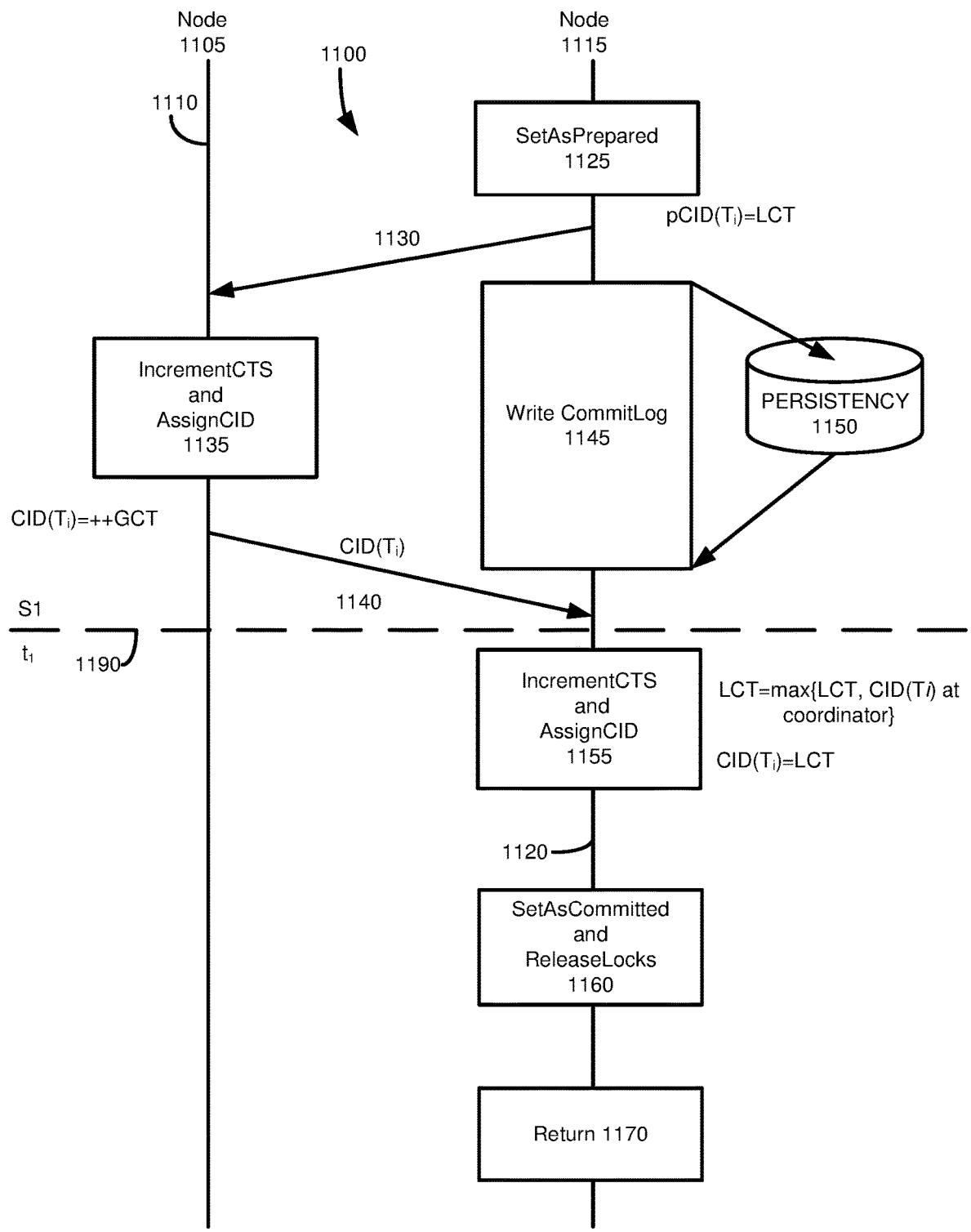
FIG. 11 is a diagram illustrating how a write transaction commits, using at least certain implementations of a disclosed distributed transaction protocol, when it has only updated tables at a single worker node.

FIG. 11 depicts a system 1100 having a coordinator node 1105 and a worker node 1115, with respective execution timelines 1110, 1120, illustrating how a write transaction commits when it has updated the tables located at the single worker node 1115. The worker node 1115 synchronizes its LCT with the GCT maintained by the coordinator node 1105. Thus, even local-only write transactions of different nodes are ordered by GCT, which can help provide snapshot monotonicity.

In FIG. 11, execution timeline 1120 of worker node 1115 begins by setting transaction $T_i$ as prepared, or precommitted, in SetAsPrepared block 1125. Worker node 1115 then makes a call 1130 to increment a synchronization token (such as the CTS) at the coordinator node 1105 (which is a global synchronization token, such as the GCT) and assign a synchronization token (such as a CID) for $T_i$ at the coordinator node 1105 in process block 1135. The GCT increment operation (call 1130, IncrementCTS and AssignCID 1135, and return communication 1140 with the assigned CID for $T_i$) is called in parallel with the WriteCommitLog process 1145 at worker node 1115, where the log is written to persistent storage 1150.

Since WriteCommitLog 1145 involves synchronous persistency I/O for transaction durability, overlapping the network I/O with the log persistency I/O can substantially hide the cost of the newly added network I/O operation. Although overlapping the network I/O with the persistency I/O can help reduce the transaction commit latency, the overall throughput can be eventually bound by the network bandwidth of the coordinator node 1105. Thus, in particular examples of the disclosed distributed transaction protocol, the network calls initiated from concurrent transactions are grouped and coalesced to a single network call, like the group commit operation for log persistency I/O. The commit log entry of the single-node write transaction at the worker node 1115 is written to the local log volume 1150 of the worker node 1115 without making any additional round trip to the coordinator node 1105. During recovery of the worker node 1115, node-local write transaction commits can be decided by the worker node 1115 without coordination or communication with the coordinator node 1105.

The IncrementCTS (the LCT of worker node 1115) and AssignCID operations in process block 1155 use the results of the GCT increment in block 1135, incrementing the CTS (LCT of node 1115) as shown. As discussed above, the GCT increment operation 1135 involves a synchronous network round trip between the worker node 1115 and the coordinator node 1105.

In case the network operation with the coordinator 1105 node, needed for IncrementCTS and AssignCID in operation 1155, fails, while the log persistency I/O succeeds in block 1145, the network operation 1130 is retried until the coordinator node 1105 becomes available again to the worker node 1115. If the worker node 1115 crashes while in this retry state, the transaction is simply committed during restart of the worker node 1115 and then $LCT_i$=++GCT is performed at the end of the restart phase of worker node 1115. Similarly, if the log persistency I/O fails in block 1145 while the network operations 1130, 1140 succeed, the worker node 1115 can proceed to the next operation only after the log persistency I/O operation is successfully retried.

After the transaction is assigned a CID in block 1155, the transaction is marked as committed in process 1160. Any write locks acquired at worker node 1115 for the transaction are also released in block 1160. In process 1170, the transaction is acknowledged as completed to the database client (not shown) that initiated $T_i$.

With the delayed visibility decision scheme shown in FIG. 11, using the precommit of block 1125, a global statement S1 starting at timepoint t1 (1190) will not see $T_1$'s change immediately at the timepoint t1. But, later, as soon as $T_i$ finishes SetAsCommitted, $T_i$'s change will be visible to S1. In this way, without adding any additional lock or synchronization among write transactions, the GCT and LCT increment operations become effectively atomic to other concurrent readers.

Figure 12:
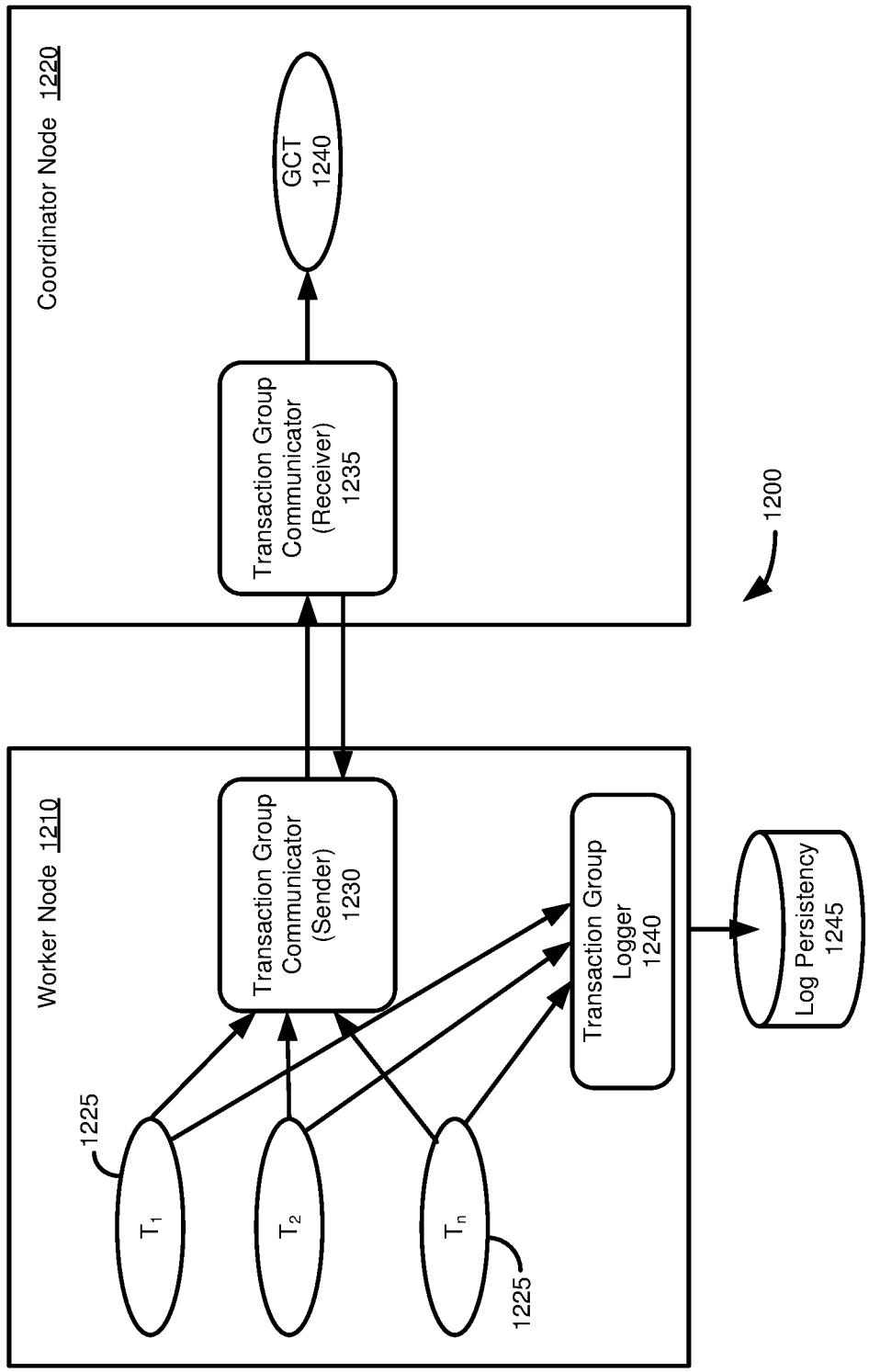
FIG. 12 provides an architecture that may be used with at least certain implementations of a disclosed distributed transaction protocol to group communication requests and commit requests at a worker node to be sent to a coordinator node.

FIG. 12 provides an architecture 1200 illustrating how network calls at a worker node 1210 may be grouped and coalesced to a single network call to a coordinator node 1220. The worker node 1210 includes a plurality of transactions 1225, $T_1$-$T_n$. The transactions 1225 send communication requests for the worker node 1220 to a sender side of a transaction group communicator 1230. The communication requests from the worker node 1210 are sent by the sender side of the group communicator 1230 to a receiver side of a transaction group communicator 1235 maintained at the coordinator node 1220. The receiver side transaction group communicator 1235 mediates concurrent access to one or more synchronization tokens, (such as the GCT or cached watermark values) 1240 maintained by the coordinator node 1220, which assigns synchronization tokens (such as CIDs) to the transactions and increments the synchronization tokens (such as the GCT) as appropriate. The assigned synchronization tokens (such as CIDs) are returned to the sender side transaction group communicator 1230. As network requests are enqueued at the sender side transaction group communicator 1230, an additional delay may be introduced, but it is typically trivial in most cases compared to the latency needed for communication with the coordinator node 1220.

A transaction group logger 1240 at the worker node 1210 mediates group commit access to logging I/O requests to persistent storage 1245

Figure 13:
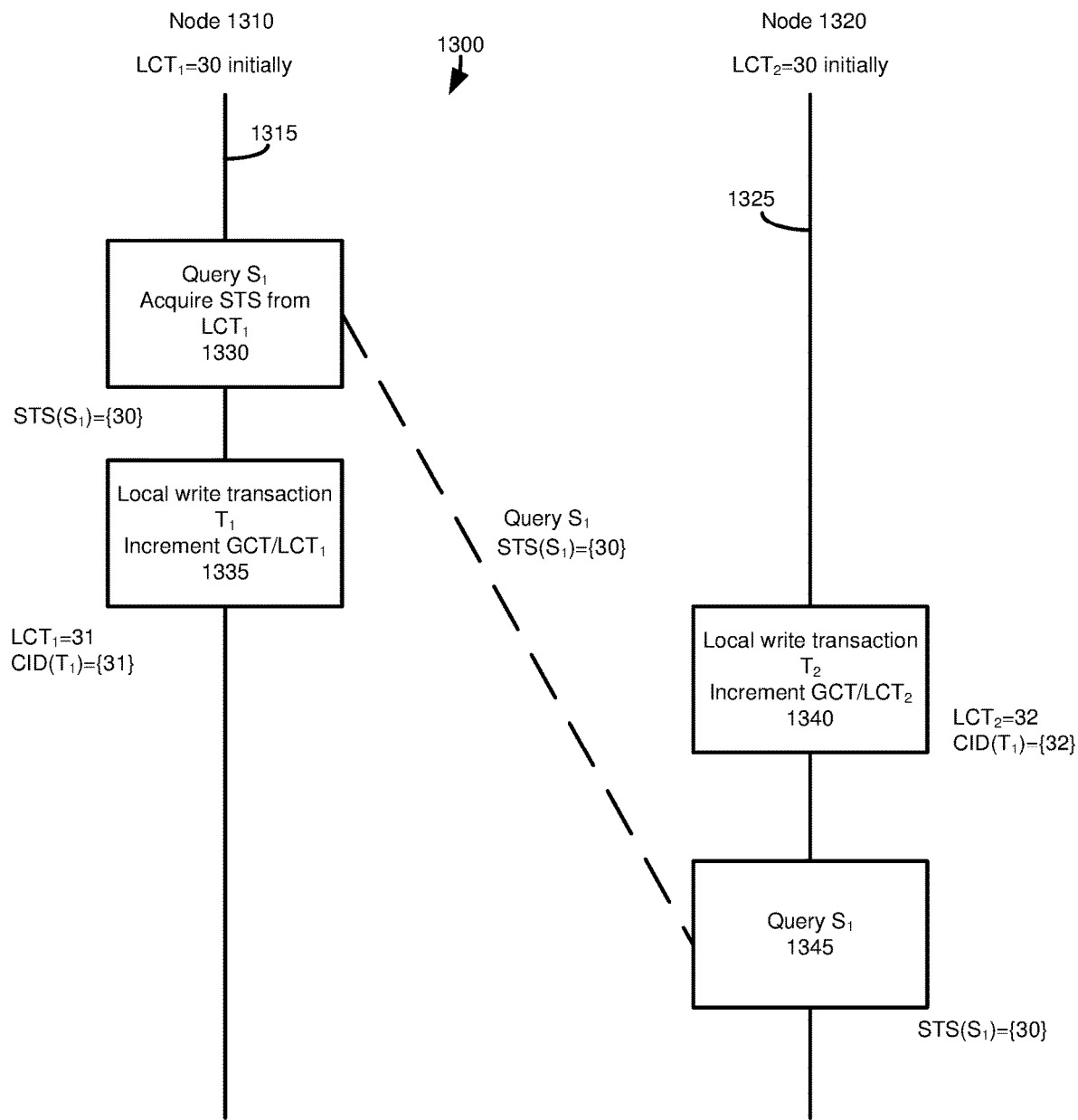
FIG. 13 is a diagram illustrating operations providing snapshot monotonicity occurring at first and second worker nodes using at least certain implementations of a disclosed distributed transaction protocol.

FIG. 13 presents a system 1300 that is a modified version of the system 500 of FIG. 5, adapted to the system 1100 of FIG. 11, illustrating how an embodiment of the disclosed distributed transaction protocol can provide snapshot monotonicity. Worker nodes 1310, 1320, with respective execution timelines 1315, 1325, have initial GCT values of 30 because every local write transaction increments GCT in at least certain implementations of the disclosed distributed transaction protocol. Assuming the initial GCT value is 30, $S_1$ will start with $STS(S_1)=30$ in process 1330. Subsequently, write transaction $T_1$ executed in process block 1335 at worker node 1310, will increment GCT to 31 and set $CID(T_1)=31$ at node 1310.

Write transaction $T_2$ executed at worker node 1320 in process 1340 will increment GCT to 32 and set $CID(T_2)=32$. Thus, both of $T_1$ and $T_2$'s changes, with respective CIDs of 31 and 32, will not be visible to $S_1$, which carries with it the initially assigned STS of 30 when it executes at node 1320 at process 1345, which is less than the CIDs of $T_1$ and $T_2$.

Figure 14:
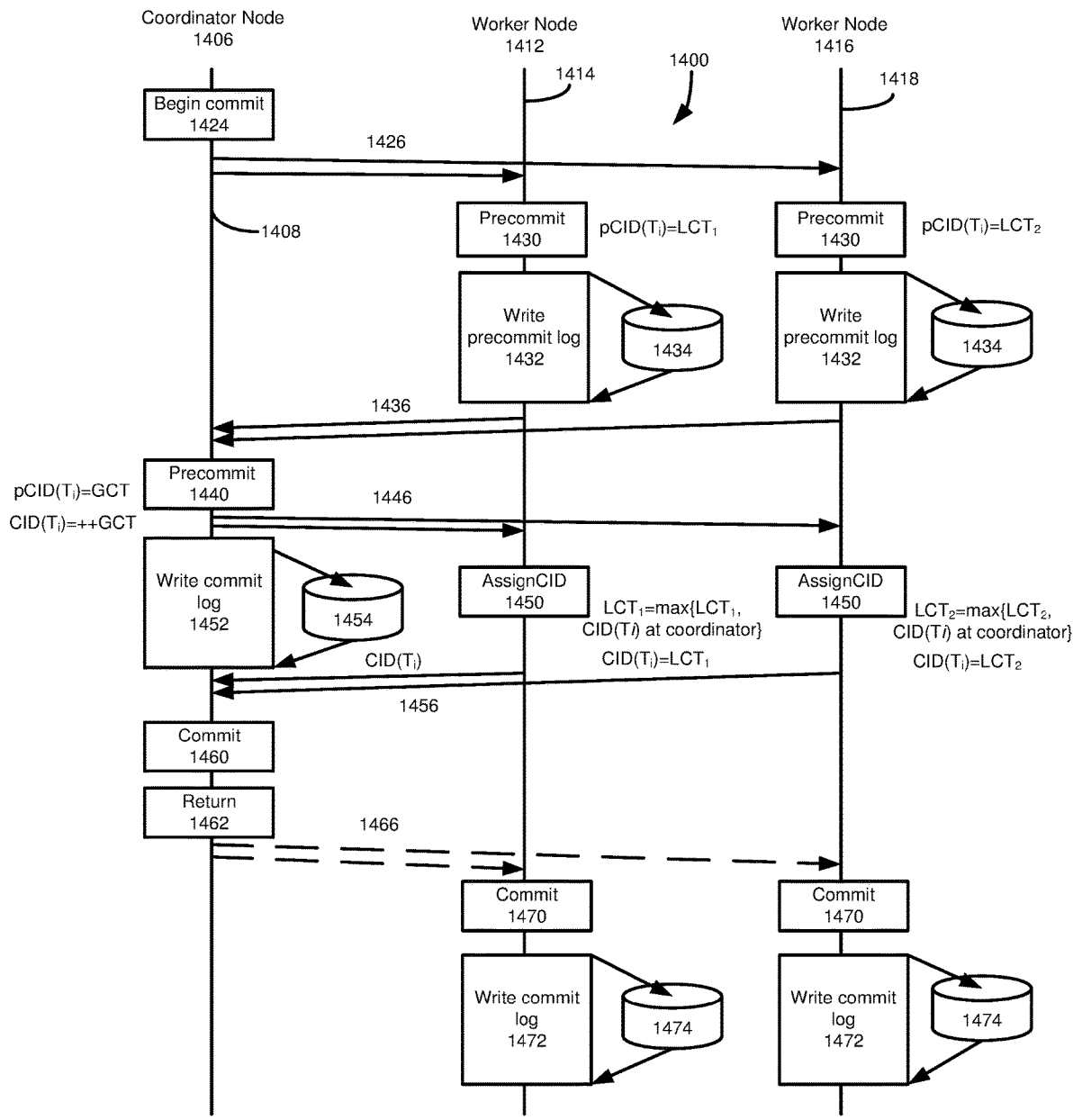
FIG. 14 is a diagram illustrating how a write transaction commits, using at least certain implementations of a disclosed distributed transaction protocol, when it has updated tables at first and second worker nodes.

FIG. 14 presents a system 1400 having a coordinator node 1406 and worker nodes 1412, 1416, with respective execution timelines 1408, 1414, 1418. The system 1400 illustrates how a write transaction commits after having updated the tables located in more than a single worker node 1412, 1416. To help provide durable atomicity of changes in multiple nodes 1406, 1412, 1416, the system 1400 employs a two-phase commit approach. The commit log of the coordinator node 1406 is written only after the precommit log entries of the transaction are safely written to persistent storage at all of the worker nodes 1412, 1416 changed by the transaction.

The commit protocol begins in block 1424, where the coordinator node 1406 sends communications 1426 to the worker nodes 1412, 1416 to prepare the worker nodes for the transaction commit. For example, the coordinator node 1406 may send the communications 1426 in response to a request by a database client (not shown) to commit the transaction. The communications 1426, in a particular example, include a TransactionID for the transaction to be committed. In precommit blocks 1430, each worker node 1412, 1416 executes SetAsPrepared to precommit the transaction, assigning the transaction the LCT currently maintained at the worker node. The worker nodes 1412, 1416 then write the transaction to persistent storage 1434, such as in a precommit log, in block 1432, flushing the pending redo logs of the transaction. The worker nodes 1412, 1416 then communicate with the coordinator node 1402, via notifications 1436, indicating that the transaction has been precommitted at the worker nodes and confirming to the coordinator about the commit readiness of the worker nodes.

When the coordinator node 1406 receives the notifications 1436, in process block 1440, the coordinator node precommits the transaction, assigning the transaction a pCID equal to the current GCT maintained by the coordinator node. The coordinator node 1406 also increments the CTS (which is also the GCT, in this case, using IncrementCTS), and assigns the incremented CTS to the transaction as the CID (using AssignCID). Once the coordinator node 1406 has precommitted the transaction, including assigning the CID, the coordinator node sends communications 1446 to the worker nodes 1412, 1416 indicating the precommitment and associated CID. The worker nodes 1412, 1416 then execute process blocks 1450, in which they increment their locally maintained LCT value (such as using IncrementCTS). In a particular example, the worker nodes 1412, 1416 select as the new LCT value the larger of the current LCT value maintained at the worker node and the CID for the transaction received from the coordinator node 1406 in communication 1446. The worker nodes 1412, 1416 then assign the new LCT value as the CID for the transaction. Each worker node 1412, 1416, after completing block 1450, sends a communication 1456 to the coordinator node 1406, indicating that the transaction was successfully assigned a new CID at the worker nodes. While the communications 1446, and the increment and assign functions of blocks 1450, are being carried out, the coordinator node 1406 writes the commit to persistent storage 1454 in block 1452 (using WriteCommitLog, for example), such as to a commit log.

When the persistency operation 1452 has completed, and the coordinator node 1406 has received the communications 1456 from each of the worker nodes 1412, 1416, the coordinator node marks the transaction as committed and releases the write locks on the record, such as using SetAsCommitted and ReleaseLocks, in process block 1460. The completion of the transaction is acknowledged by the coordinator node 1406 to the client that initiated the transaction (not shown) in block 1462 (such as using the Return operation).

The coordinator node 1406 sends communications 1466 to the worker nodes 1412, 1416, such as asynchronously, that the transaction has been committed by the coordinator node. When the worker nodes 1412, 1416 receive the communication 1466, the worker nodes commit the transaction and release their record write locks in process 1470. The transaction commit is then written by the worker nodes 1412, 1416 to persistent storage 1474, such as a commit log, in process block 1472.

As explained above, the process used in system 1400 involves several communications between the coordinator node 1406 and the worker nodes 1412, 1416. To reduce potential performance impacts from these communications, such as network round trips, during commit processing, the second round trip (communications 1446 and 1456) is overlapped by the log persistency I/O and the third trip (which does not need to be a round trip, in at least some examples) is carried out asynchronously after the transaction's commit is acknowledged to the client in process 1462. In terms of transaction latency, only the first round trip, used to help provide durable atomicity for multi-node write transactions, presents an added latency cost. In terms of transaction processing throughput, the network cost is reduced, in some examples, by grouping and coalescing the network I/O requests made by concurrent write transactions (such as described with reference to FIG. 12). By acknowledging the commit earlier in the commit process, without waiting for the final commitment of the transaction by the worker nodes 1412, 1416 in process blocks 1470, 1472, the next operation of the same session might encounter a tentative lock conflict if the next operation tries to update the same record updated by the previous write transaction. In at least some implementations, the tentative conflict should not produce any unexpected behavior for end users, because the lock wait time period will typically be short compared to common lock timeout values. Following the ordering 900 of FIG. 9, in at least some implementations, the second round trip (1446, 1456), is not skipped or coalesced with the third communication (1466), because the IncrementCTS operation should be carried out before the Return operation.

The multi-node write transaction commit process described in FIG. 14 also takes advantage of the delayed visibility decision scheme during the in-doubt period for visibility atomicity across changes distributed to multiple nodes. One difference between FIG. 14 and FIG. 8 is that the coordinator node 1406 additionally has an in-doubt period so that it can decide the write transaction's CID value earlier and the network I/O for CID propagation (communication 1446) can be overlapped by the log persistency I/O (1452) for WriteCommitLog at the coordinator node 1406.

The WriteCommitLog operations 1472 at the worker nodes 1412, 1416 can be initiated after the Return operation 1462 at the coordinator node 1406. Even if a worker node 1412, 1416 crashes without having written its local commit log, the transaction can be detected as an in-doubt transaction during its restart and thus it can be committed again by referring to the coordinator node 1406. If there is neither a precommit nor a commit log entry at a worker node 1412, 1416, then the transaction can be rolled back at the worker node without asking the coordinator node 1406. In case there is a failure during the WriteCommitLog operation 1452 at the coordinator node 1406, or the AssignCID/IncrementCTS operations 1450 at the worker nodes 1412, 1416, a fault handling similar to the one described for FIG. 8 is applied. Other fault tolerance behavior is, in some examples, similar to other two-phase commit protocols.

Note that, in FIG. 14, as long as pCID(T) is smaller than CID(T) for a write transaction T, the pCID values of a transaction at different nodes do not need to have the same value, while CID values should be identical, because the pCID values are used as a hint for early filtering of false positive cases.

Figure 15:
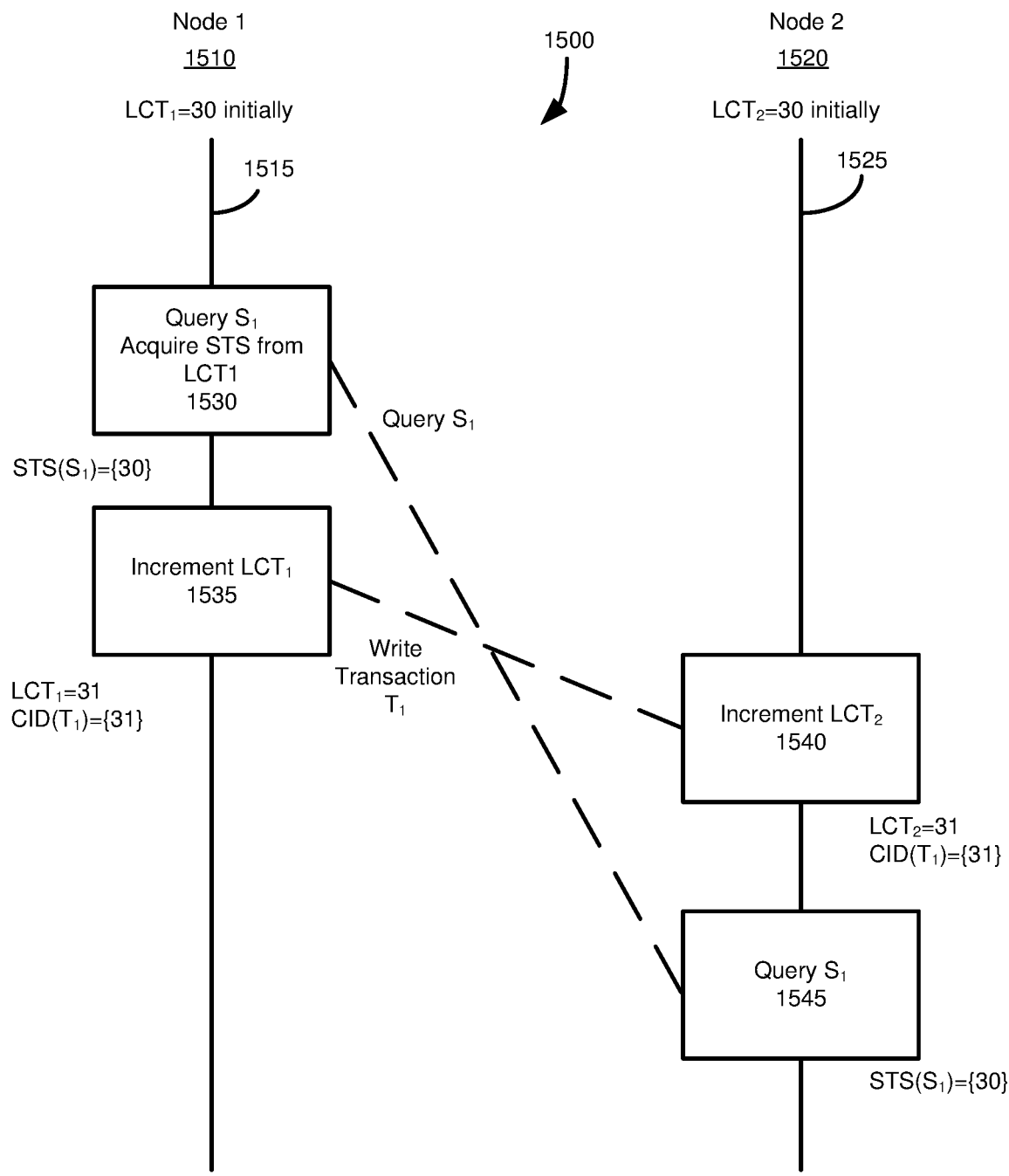
FIG. 15 is a diagram illustrating operations providing visibility atomicity occurring at first and second worker node using at least certain implementations of a disclosed distributed transaction protocol.

FIG. 15 depicts a system 1500 having two worker nodes 1510, 1520 with respective execution timelines 1515, 1525, illustrating how at least certain implementations of the disclosed transaction protocol can help resolve the visibility atomicity issue described in conjunction with the system 400 of FIG. 4. In FIG. 15, the initial GCT value will be 30 or higher, because, according to the implementations, every local write transaction increments GCT. Assuming the initial GCT value is 30, $S_1$ will start with $STS(S_1)$=30 at block 1530. Then, $T_1$ will increment the GCT to 31 and set $CID(T_1)$=31 at both of node 1510 and node 1520 in processes 1535 and 1540. Therefore, $T_1$'s changes will not be visible to $S_1$ at neither node 1510 nor node 1520, as $S_1$ carries with it the STS of 30 from node 1510 when executed on node 1520 at process 1545, and that STS is less than the CID of $T_2$.

Figure 16A:
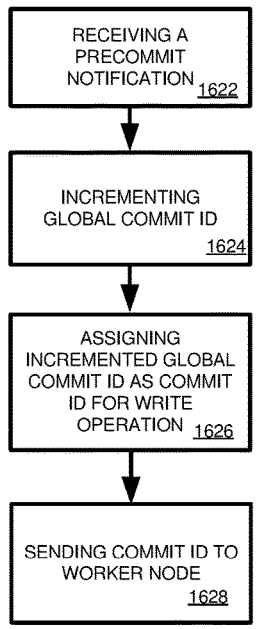
FIG. 16A is a flowchart of an example method summarizing actions occurring at a coordinator node during an embodiment of the present disclosure facilitating transaction consistency.

FIG. 16A provides a flowchart of a method 1620 for facilitating database transaction processing within a database environment implemented, at least in part, by a coordinator node that is in communication with a worker node. In step 1622, the coordinator node receives a precommit notification from the worker node, the precommit notification being associated with a write operation at the worker node. The coordinator node increments a global commit ID, such as a global commit timestamp, maintained by the coordinator node in step 1624. In step 1626, the coordinator node assigns the incremented global commit ID as the commit ID of the write operation. The coordinator node, in step 1628, sends the commit ID for the write operation to the worker node.

Figure 16B:
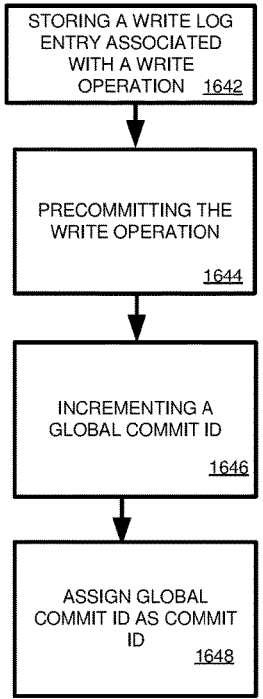
FIG. 16B is a flowchart of an example method summarizing actions occurring at a coordinator node during an embodiment of the present disclosure facilitating transaction consistency.

FIG. 16B presents a flowchart of a method 1640 for facilitating database transaction processing within a database environment implemented, at least in part, by a coordinator node. In step 1642, the coordinator node stores a write log entry associated with a database operation. The database write operation is precommitted by the coordinator node in step 1644. In step 1646, the coordinator node increments a global commit ID, such as a global commit timestamp, maintained by the coordinator node. The incremented global commit ID, in step 1648, is assigned as the commit ID for the database write operation.

Figure 16C:
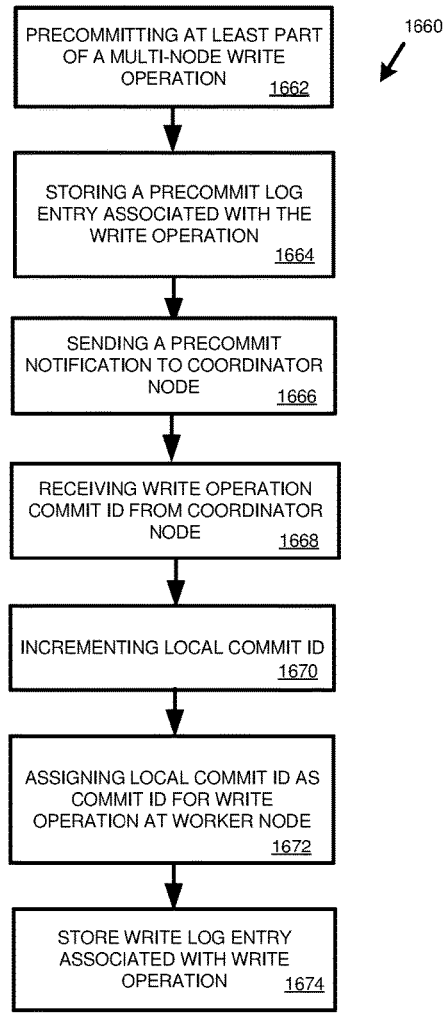
FIG. 16C is a flowchart of an example method summarizing actions occurring at a worker node during an embodiment of the present disclosure facilitating transaction consistency.

A flowchart of a method 1660 for facilitating database transaction processing within a database environment implemented, at least in part, by a first worker node in communication with at least a second worker node and a coordinator node, is illustrated in FIG. 16C. In step 1662, the first worker node precommits at least a portion of a multi-node database write operation. The first worker node stores a precommit log entry associated with the at least a portion of the multi-node database write operation in step 1664. In step 1666, the first worker node sends a precommit notification to the coordinator node and, in step 1668, receives a commit ID from the coordinator node associated with the multi-node write operation. An increment operation for a local commit ID maintained by the first worker node is carried out in step 1670. The first worker node assigns the local commit ID as the commit ID for the multi-node database write operation at the first worker node in step 1672. In step 1674, the first worker node stores a write log entry associated with the commitment of the multi-node database write operation at the first worker node.

Example 6—Computing Systems

Figure 17:
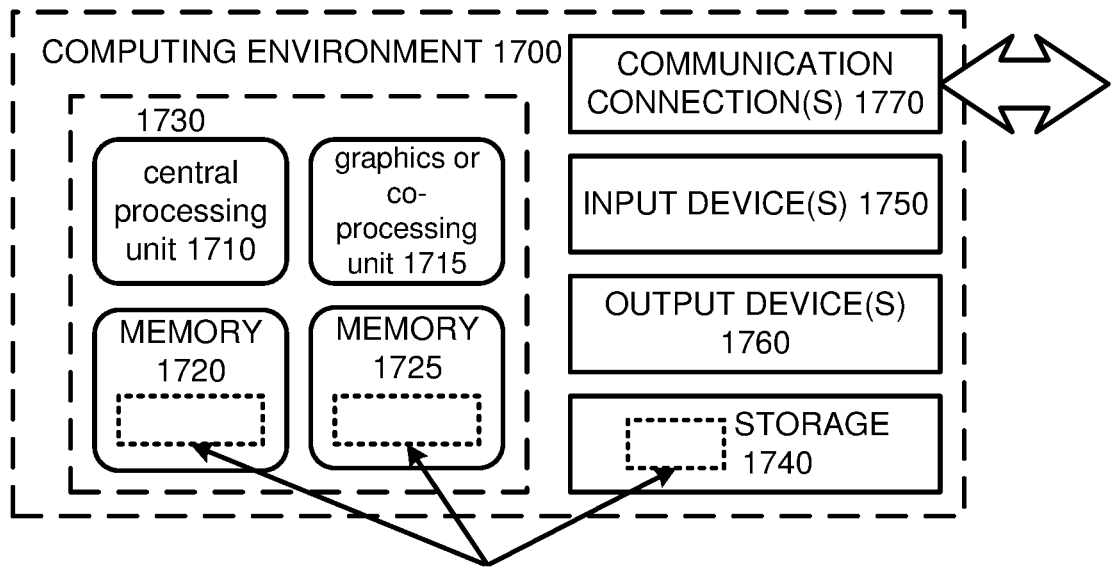
FIG. 17 is a diagram of an example computing system in which some described embodiments can be implemented.

FIG. 17 depicts a generalized example of a suitable computing system 1700 in which the described innovations may be implemented. The computing system 1700 is not intended to suggest any limitation as to scope of use or functionality of the present disclosure, as the innovations may be implemented in diverse general-purpose or special-purpose computing systems.

With reference to FIG. 17, the computing system 1700 includes one or more processing units 1710, 1715 and memory 1720, 1725. In FIG. 17, this basic configuration 1730 is included within a dashed line. The processing units 1710, 1715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 may be volatile memory (e.g., registers, cache, RAM), non-volatile memory (e.g., ROM, EEPROM, flash memory, etc.), or some combination of the two, accessible by the processing unit(s) 1710, 1715. The memory 1720, 1725 stores software 1780 implementing one or more innovations described herein, in the form of computer-executable instructions suitable for execution by the processing unit(s) 1710, 1715.

A computing system 1700 may have additional features. For example, the computing system 1700 includes storage 1740, one or more input devices 1750, one or more output devices 1760, and one or more communication connections 1770. An interconnection mechanism (not shown) such as a bus, controller, or network interconnects the components of the computing system 1700. Typically, operating system software (not shown) provides an operating environment for other software executing in the computing system 1700, and coordinates activities of the components of the computing system 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing system 1700. The storage 1740 stores instructions for the software 1780 implementing one or more innovations described herein.

The input device(s) 1750 may be a touch input device such as a keyboard, mouse, pen, or trackball, a voice input device, a scanning device, or another device that provides input to the computing system 1700. The output device(s) 1760 may be a display, printer, speaker, CD-writer, or another device that provides output from the computing system 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 7—Cloud Computing Environment

Figure 18:
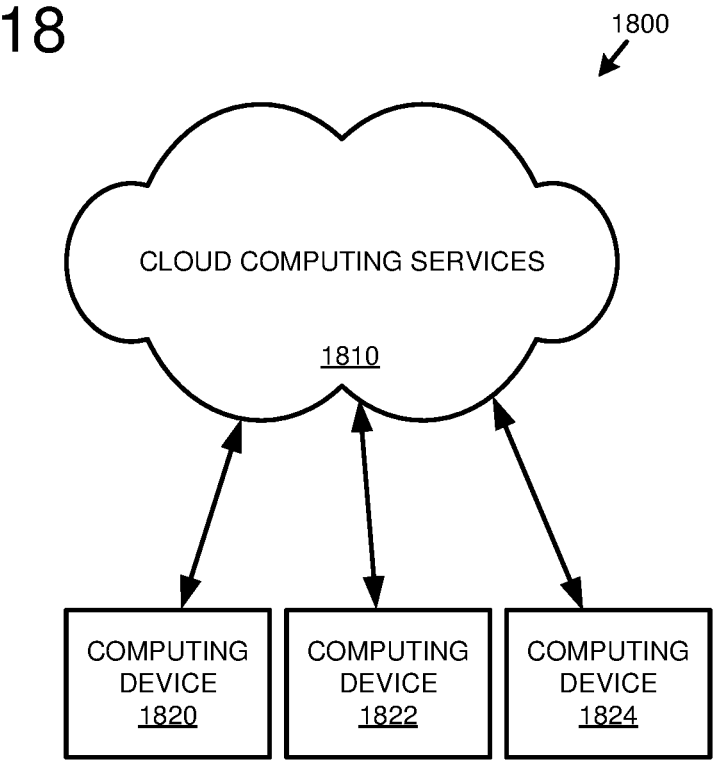
FIG. 18 is an example cloud computing environment that can be used in conjunction with the technologies described herein.

FIG. 18 depicts an example cloud computing environment 1800 in which the described technologies can be implemented. The cloud computing environment 1800 comprises cloud computing services 1810. The cloud computing services 1810 can comprise various types of cloud computing resources, such as computer servers, data storage repositories, networking resources, etc. The cloud computing services 1810 can be centrally located (e.g., provided by a data center of a business or organization) or distributed (e.g., provided by various computing resources located at different locations, such as different data centers and/or located in different cities or countries).

The cloud computing services 1810 are utilized by various types of computing devices (e.g., client computing devices), such as computing devices 1820, 1822, and 1824. For example, the computing devices (e.g., 1820, 1822, and 1824) can be computers (e.g., desktop or laptop computers), mobile devices (e.g., tablet computers or smart phones), or other types of computing devices. For example, the computing devices (e.g., 1820, 1822, and 1824) can utilize the cloud computing services 1810 to perform computing operators (e.g., data processing, data storage, and the like).

Example 8—Features

Different embodiments may include one or more of the inventive features shown in the following table of features.

| # | Feature |
|---|---|
| | A. Global snapshot management by coordinator node with asynchronous end of global snapshot notification. |
| A1 | A method, implemented at least in part by a coordinator node comprising a processing unit and memory, the coordinator node being in communication with a worker node, for facilitating database transaction processing within a database environment, the method comprising: receiving a request from the worker node for at least one global synchronization token maintained by the coordinator node; starting a global snapshot associated with the request; sending the at least one global synchronization token to the worker node; receiving a notification from the worker node to end the global snapshot associated with the request, the notification being sent asynchronously by the worker node such that the worker node continues processing without awaiting a reply to the notification; and ending the global snapshot associated with the request. |
| A2 | The method of claim A1, further comprising maintaining, at the coordinator node, a set representing active global snapshots in the database environment. |
| A3 | The method of claim A2, wherein starting the global snapshot associated with the request comprising adding the global snapshot to the set. |
| A4 | The method of claim A2, wherein ending the global snapshot associated with the request comprises removing the global snapshot from the set. |
| A5 | The method of claim A2, wherein each global snapshot of the set is associated with a timestamp. |
| A6 | The method of claim A5, further comprising maintaining a minimum active global timestamp value representing the oldest timestamp for the active global snapshots in the set. |
| A7 | The method of claim A6, further comprising sending the minimum active global timestamp value to the worker node for version garbage collection. |
| A8 | The method of claim A7, further comprising, at the worker node: determining a minimum active local timestamp value; determining a minimum active timestamp value among the minimum active global timestamp value and the minimum active local timestamp value; comparing a version timestamp of a database record with the minimum active timestamp value; and maintaining the database record if the version timestamp is greater than or equal to than the minimum active timestamp value. |

| # | Feature |
|---|---|
| A9 | The method of claim A1, wherein receiving the request and sending the at least one global synchronization token are carried out synchronously such that the worker node blocks at least some operations until receiving the at least one global synchronization token. |
| A10 | The method of claim A1, further comprising, during execution of at least part of a query at the worker node, determining whether a database record is visible to the query, wherein the database record is visible to the query if the database record has been committed and has a commit ID value that is less than or equal to a snapshot ID value, the snapshot ID value being based at least in part on the at least one global synchronization token. |
| A11 | The method of claim A10, wherein the commit ID and snapshot ID values comprise timestamps. |
| A12 | The method of claim A10, wherein the commit ID value is an integer. |
| A13 | The method of claim A10, wherein the snapshot ID value comprises an integer. |
| A14 | The method of claim A11, wherein the snapshot ID value and the commit ID value have the same value. |
| A15 | The method of claim A1, wherein the snapshot ID value and the commit ID value have different values. |
| A16 | The method of claim A1, wherein the at least one global synchronization token comprises an integer. |
| A17 | The method of claim A1, wherein the at least one global synchronization token is an integer. |
| A18 | The method of claim A1, wherein the at least one global synchronization token is a global commit ID maintained by the coordinator node. |
| A19 | The method of claim A1, wherein the at least one global synchronization token is a global commit timestamp maintained by the coordinator node. |
| A20 | The method of claim A19, wherein the global commit timestamp is an integer. |
| A21 | The method of claim A1, further comprising, during execution of at least part of a query at the worker node, determining whether a database record is visible to the query by comparing a snapshot ID value associated with the global snapshot to a precommit ID associated with the database record. |
| A22 | The method of claim A21, wherein the snapshot ID value and the precommit ID value comprise timestamps. |
| A23 | The method of claim A21, wherein the database record is not visible to the query if snapshot ID value is less than or equal to the precommit ID value. |
| A24 | The method of claim A21, wherein if the snapshot ID value is greater than the precommit ID value, the determining whether the database record is visible is postponed until the database record is committed or aborted. |
| A25 | The method of claim A1, wherein the request is associated with a data manipulation language statement for a query. |
| A26 | The method of claim A1, wherein the request is associated with a transaction for a query, the transaction comprising one or more of data manipulation language statements. |
| A27 | The method of claim A1, wherein the at least one global synchronization token comprises a timestamp. |
| A28 | The method of claim A1, wherein the at least one global synchronization token comprises a watermark cached by the coordinator node and associated with status of the worker node. |
| A29 | The method of claim A1, wherein the request from the worker node is received in a network communication comprising a plurality of requests for one or more additional synchronization tokens maintained by the coordinator node. |

B. Global snapshot management by coordinator node with worker node watermark.

| # | Feature |
|---|---|
| B1 | A method, implemented at least in part by a coordinator node comprising a processing unit and memory, the coordinator node being in communication with a worker node, for facilitating database transaction processing within a database environment, the method comprising:<br>receiving a request from the worker node for at least first and second synchronization tokens maintained by the coordinator node;<br>starting a global snapshot associated with the request;<br>sending the at least first and second synchronization tokens to the worker node, the second synchronization token comprising a watermark cached by the coordinator node and associated with status of the worker node;<br>receiving a notification from the worker node to end the global snapshot associated with the request; and<br>ending the global snapshot associated with the request. |
| B2 | The method of claim B1, further comprising maintaining, at the coordinator node, a set representing active global snapshots in the database environment. |
| B3 | The method of claim B2, wherein starting the global snapshot associated with the request comprising adding the global snapshot to the set. |
| B4 | The method of claim B2, wherein ending the global snapshot associated with the request comprises removing the global snapshot from the set. |
| B5 | The method of claim B2, wherein each global snapshot of the set is associated with a timestamp. |
| B6 | The method of claim B5, further comprising maintaining a minimum active global timestamp value representing the oldest timestamp for the active global snapshots in the set. |
| B7 | The method of claim B6, further comprising sending the minimum active global timestamp value to the worker node for version garbage collection. |
| B8 | The method of claim B7, further comprising, at the worker node:<br>determining a minimum active local timestamp value;<br>determining a minimum active timestamp value among the minimum active global timestamp value and the minimum active local timestamp value;<br>comparing a version timestamp of a database record with the minimum active timestamp value; and<br>maintaining the database record if the version timestamp is greater than or equal to than the minimum active timestamp value. |
| B9 | The method of claim B1, wherein receiving the request and sending the at least first and second synchronization tokens are carried out synchronously such that the worker node blocks at least some operations until receiving the first synchronization token. |
| B10 | The method of claim B1, further comprising, during execution of at least part of a query at the worker node, determining whether a database record is visible to the query, wherein the database record is visible to the query if the database record has been committed and has a commit ID value that is less than or equal to a snapshot ID value, the snapshot ID value being based at least in part on the first global synchronization token. |
| B11 | The method of claim B10, wherein the commit ID and snapshot ID values comprise timestamps. |
| B12 | The method of claim B11, wherein the snapshot ID value is an integer. |
| B13 | The method of claim B11, wherein the snapshot ID value comprises an integer. |
| B14 | The method of claim B11, wherein the snapshot ID value and the commit ID value have the same value. |
| B15 | The method of claim B11, wherein the commit ID value is an integer. |
| B16 | The method of claim B1, wherein the first synchronization token comprises an integer. |
| B17 | The method of claim B1, wherein the first synchronization token is an integer. |
| B18 | The method of claim B1, wherein the first synchronization token is a global commit ID maintained by the coordinator node. |
| B19 | The method of claim B1, wherein the first synchronization token is a global commit timestamp maintained by the coordinator node. |
| B20 | The method of claim B19, wherein the global commit timestamp is an integer. |
| B21 | The method of claim B1, further comprising, during execution of at least part of a query at the worker node, determining whether a database record is visible to the query by comparing a snapshot ID value associated with the global snapshot to a precommit ID associated with the database record. |
| B22 | The method of claim B21, wherein the snapshot ID value and the precommit ID value comprise timestamps. |
| B23 | The method of claim B21, wherein the database record is not visible to the query if snapshot ID value is less than or equal to the precommit ID value. |
| B24 | The method of claim B21, wherein if the snapshot ID value is greater than the precommit ID value, the determining whether |

| # | Feature |
|---|---|
| | the database record is visible is postponed until the database record is committed or aborted. |
| B25 | The method of claim B1, wherein the request is associated with a data manipulation language statement for a query. |
| B26 | The method of claim B1, wherein the request is associated with a transaction for a query, the transaction comprising one or more of data manipulation language statements. |
| B27 | The method of claim B1, wherein the first synchronization token comprises a timestamp. |
| B28 | The method of claim B1, wherein the notification to end the global snapshot is sent asynchronously by the worker node such that the worker node continues processing without awaiting a reply to the notification. |
| B29 | The method of claim B1, wherein the request from the worker node is received in a network communication from the worker node comprising a plurality of requests for one or more additional synchronization tokens maintained by the coordinator node. |
| | C. Interaction of worker node with coordinator node managing global snapshots and synchronization token providing access to first and second worker nodes. |
| C1 | A method, implemented at least in part by a first worker node comprising a processing unit and memory, the first worker node being in communication with a coordinator node and at least a second worker node, for facilitating database transaction processing within a database environment, the method comprising: sending a request to the coordinator node for at least a first synchronization token maintained by the coordinator node; receiving the at least a first synchronization token from the coordinator node; assigning at least part of the at least a first synchronization token to a global snapshot as a snapshot ID value; executing at least part of a query that involves the global snapshot; and forwarding the snapshot ID value to the at least a second worker node. |
| C2 | The method of claim C1, further comprising, when executing the at least part of the query that involves the global snapshot, determining whether a database record is visible to the query, wherein the database record is visible to the query if the database record has been committed and has a commit ID value that is less than or equal to the snapshot ID value. |
| C3 | The method of claim C2, wherein the commit ID and snapshot ID values comprise timestamps. |
| C4 | The method of claim C1, further comprising, when executing the at least part of the query that involves the global snapshot, determining whether a database record is visible to the query by comparing the snapshot ID value to a precommit ID value associated with the database record. |
| C5 | The method of claim C4, wherein the snapshot ID value and the precommit ID value comprise timestamps. |
| C6 | The method of claim C4, wherein the database record is not visible to the query if the snapshot ID value is less than or equal to the precommit ID value. |
| C7 | The method of claim C4, wherein if the snapshot ID value is greater than the precommit ID value, the determining whether the database record is visible is postponed until the database record is committed or aborted. |
| C8 | The method of claim C1, wherein the request is associated with a data manipulation language statement for the query. |
| C9 | The method of claim C1, wherein the request is associated with a transaction for the query, the transaction comprising one or more data manipulation language statements. |
| C10 | The method of claim C1, wherein the at least a first synchronization token comprises a global commit ID comprising a timestamp. |
| C11 | The method of claim C1, further comprising receiving from the coordinator node a minimum active global timestamp value representing an oldest timestamp in a set of active global timestamps in the database environment. |
| C12 | The method of claim C11, further comprising: determining a minimum active local timestamp value; determining a minimum active timestamp value among the minimum active global timestamp value and the minimum active local timestamp value; comparing a version timestamp of a database record with the minimum active timestamp value; and deleting the database record if the version timestamp is less than the minimum active timestamp value. |
| C13 | The method of claim C1, wherein sending the request for the at least a first synchronization token to the coordinator node and receiving the at least a first synchronization token from the coordinator node are carried out synchronously such that the first worker node blocks at least some operations until receiving the at least a first synchronization token. |
| C14 | The method of claim C1, further comprising sending a notification to the coordinator node to end the global snapshot. |
| C15 | The method of claim C14, wherein sending the notification to the coordinator node to end a global snapshot is carried out asynchronously such that the first worker node continues processing without awaiting a reply to the notification. |
| C16 | The method of claim C1, further comprising, executing the at least part of the query that involves the global snapshot at the at least a second worker node. |
| C17 | The method of claim C16, further comprising receiving execution results from the at least a second worker node at the first worker node. |
| C18 | The method of claim C16, further comprising, when executing the at least part of the query that involves the global snapshot at the a least a second worker node, determining whether a database record is visible to the query by comparing the snapshot ID value to a precommit ID value associated with the database record. |
| C19 | The method of claim C18, wherein the database record is not visible to the query if the snapshot ID value is less than or equal to the precommit ID value. |
| C20 | The method of claim C18, wherein if the snapshot ID value is greater than the precommit ID value, the determining whether the database record is visible is postponed until the database record is committed or aborted. |
| C21 | The method of claim C1, further comprising, at the first worker node, receiving the query from a client and returning query results to the client. |
| C22 | The method of claim C1, wherein receiving the at least a first synchronization token from the coordinator node comprises receiving a watermark value cached by the coordinator node and associated with status of the first worker node, the method further comprising comparing the cached watermark value to a current watermark value maintained by the first worker node. |
| C23 | The method of claim C22, further comprising aborting or restarting the query if the cached watermark value is less than the current watermark value maintained by the first worker node. |
| C24 | The method of claim C1, wherein receiving the at least a first synchronization token from the coordinator node comprises receiving a watermark value cached by the coordinator node and associated with status of the second worker node, the method further comprising comparing the cached watermark value to a current watermark value maintained by the second worker node. |
| C25 | The method of claim C24, further comprising aborting or restarting the query if the cached watermark value is less than the current watermark value maintained by the second worker node. |
| C26 | The method of claim C1, wherein the at least a first synchronization token is a global commit ID maintained by the coordinator node. |
| C27 | The method of claim C1, wherein the snapshot ID value consists of the at least a first synchronization token. |
| C28 | The method of claim C27, wherein the at least a first synchronization token consists of a global commit ID maintained by the coordinator node. |
| C29 | The method of claim C28, wherein the global commit ID consists of a global commit timestamp. |
| C30 | The method of claim C1, wherein the snapshot ID value is or is derived from the at least part of the at least a first synchronization token. |
| C31 | The method of claim C1, wherein sending the request to the coordinator node comprises grouping the request in a network communication to the coordinator node along with one or more additional requests to the coordinator node for one or more other synchronization tokens maintained by the coordinator node. |

| # | Feature |
|---|---|
| C32 | The method of claim C1, further comprising sending a notification to end the global snapshot to the coordinator node. |
| C33 | The method of claim C32, wherein the notification to end the global snapshot is sent asynchronously to the coordinator node such that the first worker node continues processing without awaiting a reply to the notification. |

D. Interaction of worker node with coordinator node managing global snapshots with asynchronous end global snapshot notification.

| # | Feature |
|---|---|
| D1 | A method, implemented at least in part by a worker node comprising a processing unit and memory, the worker node being in communication with a coordinator node, for facilitating database transaction processing within a database environment, the method comprising:<br>sending a request to the coordinator node for at least a first synchronization token maintained by the coordinator node;<br>receiving the at least a first synchronization token from the coordinator node;<br>assigning at least part of the at least a first synchronization token to a global snapshot as a snapshot ID value;<br>executing at least part of a query that involves the global snapshot; and<br>sending a notification to the coordinator node to end the global snapshot, the notification being sent asynchronously such that the worker node continues processing without awaiting a reply to the notification. |
| D2 | The method of claim D1, further comprising, when executing the at least part of the query that involves the global snapshot, determining whether a database record is visible to the query, wherein the database record is visible to the query if the database record has been committed and has a commit ID value that is less than or equal to the snapshot ID value. |
| D3 | The method of claim D2, wherein the commit ID and snapshot ID values comprise timestamps. |
| D4 | The method of claim D1, further comprising, when executing the at least part of the query that involves the global snapshot, determining whether a database record is visible to the query by comparing the snapshot ID value to a precommit ID value associated with the database record. |
| D5 | The method of claim D4, wherein the snapshot ID value and the precommit ID value comprise timestamps. |
| D6 | The method of claim D4, wherein the database record is not visible to the query if the snapshot ID value is less than or equal to the precommit ID value. |
| D7 | The method of claim D4, wherein if the snapshot ID value is greater than the precommit ID value, the determining whether the database record is visible is postponed until the database record is committed or aborted. |
| D8 | The method of claim D1, wherein the request is associated with a data manipulation language statement for the query. |
| D9 | The method of claim D1, wherein the request is associated with a transaction for the query, the transaction comprising one or more data manipulation language statements. |
| D10 | The method of claim D1, wherein the at least a first synchronization token comprises a global commit ID comprising a timestamp. |
| D11 | The method of claim D1, further comprising receiving from the coordinator node a minimum active global timestamp value representing an oldest timestamp in a set of active global timestamps in the database environment. |
| D12 | The method of claim D11, further comprising:<br>determining a minimum active local timestamp value;<br>determining a minimum active timestamp value among the minimum active global timestamp value and the minimum active local timestamp value;<br>comparing a version timestamp of a database record with the minimum active timestamp value; and a minimum active local timestamp value maintained by the worker node and deleting the database record if the version timestamp is less than the minimum active timestamp value. |
| D13 | The method of claim D1, wherein sending the request for the at least a first synchronization token to the coordinator node and receiving the at least a first synchronization token from the coordinator node are carried out synchronously such that the worker node blocks at least some operations until receiving the at least a first synchronization token. |
| D14 | The method of claim D1, further comprising, at the first worker node, receiving the query from a client and returning query results to the client. |
| D15 | The method of claim D1, wherein receiving the at least a first synchronization token from the coordinator node comprises receiving a watermark value cached by the coordinator node and associated with status of the worker node, the method further comprising comparing the cached watermark value to a current watermark value maintained by the worker node. |
| D16 | The method of claim D15, further comprising aborting or restarting the query if the cached watermark value is less than the current watermark value maintained by the worker node. |
| D17 | The method of claim D1, wherein the at least a first synchronization token is a global commit ID maintained by the coordinator node. |
| D18 | The method of claim D1, wherein the snapshot ID value consists of the at least a first synchronization token. |
| D19 | The method of claim D18, wherein the at least a first synchronization token consists of a global commit ID maintained by the coordinator node. |
| D20 | The method of claim D19, wherein the global commit ID consists of a global commit timestamp. |
| D21 | The method of claim D1, wherein the snapshot ID is or is derived from the at least part of the at least a first synchronization token. |
| D22 | The method of claim D1, wherein sending the request to the coordinator node comprises grouping the request in a network communication to the coordinator node along with one or more additional requests to the coordinator node for one or more other synchronization tokens maintained by the coordinator node. |

E. Interaction of worker node with coordinator node managing global snapshots with worker node status watermark.

| # | Feature |
|---|---|
| E1 | A method, implemented at least in part by a worker node comprising a processing unit and memory, the worker node being in communication with a coordinator node, for facilitating database transaction processing within a database environment, the method comprising:<br>sending a request to the coordinator node for a first synchronization token and at least a second synchronization token maintained by the coordinator node, the at least a second synchronization token representing a watermark value cached at the coordinator node and associated with status of the worker node;<br>receiving the first and at least a second synchronization tokens from the coordinator node;<br>comparing at least part of the at least a second synchronization token with a current watermark value maintained by the worker node; and<br>executing at least part of a query that involves a global snapshot. |
| E2 | The method of claim E1, further comprising assigning the first synchronization token to the global snapshot as a snapshot ID value. |
| E3 | The method of claim E1, further comprising, when executing the at least part of the query that involves the global snapshot, determining whether a database record is visible to the query, wherein the database record is visible to the query if the database record has been committed and has a commit ID value that is less than or equal to a snapshot ID value. |
| E4 | The method of claim E3, wherein the commit ID and snapshot ID values comprise timestamps. |
| E5 | The method of claim E1, further comprising, when executing the at least part of the query that involves the global snapshot, determining whether a database record is visible to the query by comparing a snapshot ID value to a precommit ID associated with the database record. |
| E6 | The method of claim E5, wherein the snapshot ID value and the precommit ID value comprise timestamps. |
| E7 | The method of claim E5, wherein the database record is not visible to the query if the snapshot ID value is less than or equal to the precommit ID value. |
| E8 | The method of claim E5, wherein, if the snapshot ID value is greater than the precommit ID value, the determining whether the database record is visible is postponed until the database record is committed or aborted. |
| E9 | The method of claim E1, wherein the request is associated with a data manipulation language statement for the query. |

| # | Feature |
|---|---|
| E10 | The method of claim E1, wherein the request is associated with a transaction for the query, the transaction comprising one or more data manipulation language statements. |
| E11 | The method of claim E1, wherein the first synchronization token comprises a global commit ID comprising a timestamp. |
| E12 | The method of claim E1, further comprising receiving from the coordinator node a minimum active global timestamp value representing an oldest timestamp in a set of active global timestamps in the database environment. |
| E13 | The method of claim E12, further comprising: determining a minimum active local timestamp value; determining a minimum active timestamp value among the minimum active global timestamp value and the minimum active local timestamp value; comparing a version timestamp of a database record with the minimum active timestamp value and a minimum active local timestamp value maintained by the worker node and deleting the database record if the version timestamp is less than the minimum active timestamp value. |
| E14 | The method of claim E1, wherein sending the request for the first synchronization token and the at least a second synchronization token to the coordinator node and receiving the first synchronization token and the at least a second synchronization token from the coordinator node are carried out synchronously such that the first worker node blocks at least some operations until receiving the first synchronization token. |
| E15 | The method of claim E1, further comprising, at the first worker node, receiving the query from a client and returning query results to the client. |
| E16 | The method of claim E1, further comprising aborting or restarting the query if the at least part of the at least a second synchronization token is less than the current watermark value maintained by the worker node. |
| E17 | The method of claim E1, wherein the first synchronization token is a global commit ID maintained by the coordinator node. |
| E18 | The method of claim E2, wherein the snapshot ID value consists of the at least a first synchronization token. |
| E19 | The method of claim E18, wherein the first synchronization token consists of a global commit ID maintained by the coordinator node. |
| E20 | The method of claim E19, wherein the global commit ID consists of a global commit timestamp. |
| E21 | The method of claim E2, wherein the snapshot ID value is or is derived from the at least part of the first synchronization token. |
| E22 | The method of claim E1, further comprising sending a notification to the coordinator node to end the global snapshot. |
| E23 | The method of claim E22, wherein sending the notification to the coordinator node to end the global snapshot is carried out asynchronously such that the first worker node continues processing without awaiting a reply to the notification. |
| E24 | The method of claim E1, wherein sending the request to the coordinator node comprises grouping the request in a network communication to the coordinator node along with one or more additional requests to the coordinator node for one or more other synchronization tokens maintained by the coordinator node. |
| F. Interaction of worker node with coordinator node and assigning synchronization token as snapshot ID. | |
| F1 | A method, implemented at least in part by a worker node comprising a processing unit and memory, the worker node being in communication with a coordinator node, for facilitating database transaction processing within a database environment, the method comprising: sending a request to the coordinator node for a synchronization token; receiving the synchronization token from the coordinator node; assigning at least part of the synchronization token to a global snapshot as a snapshot ID value; and executing at least part of a query that involves the global snapshot. |
| F2 | The method of claim F1, wherein the snapshot ID value consists of the synchronization token. |
| F3 | The method of claim F1, wherein the synchronization token consists of a global commit ID. |
| F4 | The method of claim F1, wherein the synchronization token consists of a global commit timestamp |
| F5 | The method of claims F3 or F4 wherein the snapshot ID value consists of the synchronization token. |
| F6 | The method of claim F1, wherein sending the request to the coordinator node comprises grouping the request in a network communication to the coordinator node along with one or more additional requests to the coordinator node for one or more other synchronization tokens maintained by the coordinator node. |
| F7 | The method of claim F1, wherein the synchronization token consists of an integer. |
| F8 | The method of claim F7, wherein the integer is an eight byte integer |
| G. Transaction commit operations at coordinator node incrementing synchronization token on transaction commit by worker node. | |
| G1 | A method, implemented at least in part by a coordinator node comprising a processing unit and memory, the coordinator node being in communication with at least a first worker node, for facilitating database transaction processing within a database environment, the method comprising: receiving a precommit notification associated with a database write operation from the at least a first worker node, the database write operation being a local write operation at the at least a first worker node; incrementing a synchronization token maintained by the coordinator node; assigning the incremented synchronization token as a commit ID for the database write operation; and sending the commit ID for the database write operation to the at least a first worker node. |
| G2 | The method of claim G1, wherein the synchronization token is a global commit ID. |
| G3 | The method of claim G1, wherein the synchronization token is a global commit timestamp. |
| G4 | The method of claim G1, the method further comprising receiving a precommit notification associated with a multi-node database write operation from the at least a first worker node, receiving a precommit notification associated with the multi-node database write operation from another worker node among the at least a first worker node, incrementing the synchronization token maintained by the coordinator node, and storing a commit write log entry associated with the multi-node database write operation. |
| G5 | The method of claim G4, further comprising designating the multi-node write operation as committed. |
| G6 | The method of claim G5, further comprising sending a commit notification to the at least a first worker node, indicating the commitment of the multi-node database write operation by the coordinator node. |
| G7 | The method of claim G6, wherein sending the commit notification to the at least a first worker node is carried out asynchronously such that the coordinator node continues processing without awaiting a reply to the notification from the at least a first worker node. |
| G8 | The method of claim G6, wherein sending the commit notification to the at least a first worker node is carried out asynchronously such that the coordinator node continues processing without awaiting a reply to the notification from at least a second worker node. |
| G9 | The method of claim G6, further comprising releasing write locks associated with the multi-node database write operation. |
| G10 | The method of claim G1, wherein the database write operation is specified with a data manipulation language statement. |
| G11 | The method of claim G1, wherein the database write operation is part of a transaction, the transaction comprising one or more data manipulation language statements. |
| G12 | The method of claim G4, further comprising receiving a notification from the at least a first worker node regarding a commit ID assigned by the at least a first worker node to the multi-node database write operation. |
| G13 | The method of claim G12, wherein storing a commit write log entry associated with the multi-node database write operation is performed between sending the commit ID to the worker node and receiving the notification from the at least a first worker node regarding the commit ID assigned by the at least a first worker node. |
| G14 | The method of claim G1, wherein the precommit notification from the worker node is received in a network communication |

| # | Feature |
|---|---|
| | comprising a plurality of precommit notifications for the worker node.<br>H. Transaction commit operations at worker node updating synchronization token at coordinator node. |
| H1 | A method, implemented at least in part by a worker node comprising a processing unit and memory, the worker node being in communication with a coordinator node, for facilitating database transaction processing within a database environment, the method comprising:<br>precommitting a local database write operation;<br>sending a request to the coordinator node to increment a global synchronization token maintained by the coordinator node;<br>receiving an incremented global synchronization token from the coordinator node; and<br>performing an increment operation on a local synchronization token maintained by the worker node; and<br>assigning a commit ID to the local database write operation. |
| H2 | The method of claim H1, further comprising storing the local database write operation in persistent storage after sending the request to the coordinator node to increment the global synchronization token. |
| H3 | The method of claim H1, further comprising receiving at least part of a query at the worker node and, if the at least part of the query can be executed locally at the worker node, assigning as a snapshot ID value the local synchronization token maintained by the worker node. |
| H4 | The method of claim H1, further comprising receiving at least part of a query at the worker node and, if the at least part of the query is a multi-node statement or transaction, sending a request to the coordinator node to start a global snapshot. |
| H5 | The method of claim H1, wherein the database write operation is specified with a data manipulation language statement. |
| H6 | The method of claim H1, wherein the database write operation is part of a transaction, the transaction comprising one or more data manipulation language statements. |
| H7 | The method of claim H1, wherein the global synchronization token comprises a global commit ID. |
| H8 | The method of claim H1, wherein the global synchronization token comprises a global commit timestamp. |
| H9 | The method of claim H1, wherein the local synchronization token comprises a local commit ID. |
| H10 | The method of claim H9, wherein the local synchronization token comprises a local commit timestamp. |
| H11 | The method of claim H1, wherein sending the request to the coordinator node comprises grouping the request in a network communication to the coordinator node along with one or more additional requests to the coordinator node for one or more other synchronization tokens maintained by the coordinator node. |
| | I. Transaction commit operations at worker node for multi-node write operation. |
| I1 | A method, implemented at least in part by a first worker node comprising a processing unit and memory, the first worker node being in communication with a coordinator node and at least a second worker node, for facilitating database transaction processing within a database environment, the method comprising:<br>precommitting at least a portion of a multi-node database write operation;<br>storing a precommit log entry associated with the at least a portion of the multi-node database write operation;<br>sending a precommit notification to the coordinator node;<br>receiving from the coordinator node a global commit ID associated with the multi-node database write operation;<br>incrementing, if appropriate, a local commit ID maintained by the first worker node;<br>sending the local commit ID to the coordinator node;<br>assigning the local commit ID as a commit ID for the multi-node database write operation; and<br>storing a write log entry associated with the commitment of the multi-node database write operation. |
| I2 | The method of claim I1, further comprising receiving a commit notification from the coordinator node designating the multi-node database write operation as committed at the coordinator node. |
| I3 | The method of claim I2, wherein receiving the commit notification from the coordinator node designating the multi-node database write operation as committed at the coordinator node is asynchronous such that the coordinator node continues processing without awaiting a reply to the commit notification from the first worker node. |
| I4 | The method of claim I3, wherein storing a write log entry associated with the commitment of the multi-node database write operation occurs after receiving the commit notification from the coordinator node designating the multi-node database write operation as committed at the coordinator node. |
| I5 | The method of claim I2, wherein storing a write log entry associated with the commitment of the multi-node database write operation occurs after receiving the commit notification from the coordinator node designating the multi-node database write operation as committed at the coordinator node. |
| I6 | The method of claim I1, further comprising, at the first worker node, comprising designating the multi-node write operation as committed. |
| I7 | The method of claim I6, wherein designating the multi-node write transaction as committed at the first worker node is asynchronous such that the first worker node continues processing without regard to the commitment of the multi-node write transaction at the coordinator node. |
| I8 | The method of claim I1, further comprising releasing record write locks associated with the multi-node database write operation on the first worker node. |
| I9 | The method of claim I1, wherein storing a write log entry associated with commitment of the multi-node database write transaction occurs asynchronously such that the first worker node continues processing without regard to commitment of the multi-node write transaction at the coordinator node and the at least a second worker node. |
| I10 | The method of claim I1, wherein incrementing the local commit ID maintained by the first worker node comprising selecting maximum of the global commit ID associated with the multi-node database write operation received from the coordinator node and a current value of the local commit ID maintained by the first worker node. |
| I11 | The method of claim I1, wherein the at least a second worker node also performs the precommitting, storing a precommit log entry, sending, receiving, incrementing, assigning, and storing a write log entry. |
| I12 | The method of claim I1, wherein sending the precommit notification to the coordinator node comprises grouping the precommit notification in a network communication to the coordinator node along with one or more additional precommit notifications to the coordinator node. |
| | J. Grouped network communication at worker node. |
| J1 | A method, implemented at least in part by a worker node comprising a processing unit and memory, the worker node being in communication with a coordinator node, for facilitating database transaction processing within a database environment, the method comprising:<br>receiving, for a plurality of database operations, a plurality of requests for a synchronization token maintained by the coordinator node;<br>grouping the plurality of requests into a network communication;<br>sending the network communication to the coordinator node;<br>receiving a network communication from the coordinator node comprising one or more synchronization tokens associated with the plurality of requests; and<br>associating the one or more synchronization tokens with the plurality of database operations. |
| J2 | The method of claim J1, wherein each of the one or more synchronization tokens comprises a global commit ID maintained by the coordinator node. |
| J3 | The method of claim J1, wherein each of the one or more synchronization tokens comprises a global commit timestamp maintained by the coordinator node. |
| J4 | The method of claim J1, wherein associating the one or more synchronization tokens with the plurality of database operations comprises using at least one of the one or more synchronization tokens to assign a snapshot ID value to at least one of the plurality of database operations. |

| # | Feature |
|---|---|
| J5 | The method of claim J1, wherein associating the one or more synchronization tokens with the plurality of database operations comprises using at least one of the one or more synchronization tokens to assign a commit ID value to at least one of the plurality of database operations. |
| J6 | The method of claim J5, further comprising:<br>sending a plurality of commit requests to a transaction group logger;<br>grouping the plurality of commit requests into a single I/O communication; and<br>sending the I/O communication to a storage device. |

K. Grouped network request at coordinator node.

| | |
|---|---|
| K1 | A method, implemented at least in part by a coordinator node comprising a processing unit and memory, the coordinator node being in communication with a worker node, for facilitating database transaction processing within a database environment, the method comprising:<br>receiving from the worker node a first network communication requesting one or more synchronization tokens for a plurality of requests associated with a plurality of database operations maintained by the coordinator node;<br>associating the one or more synchronization tokens with the plurality of database operations;<br>grouping synchronization tokens responsive to the plurality of requests into a second network communication; and<br>sending the second network communication to the worker node. |
| K2 | The method of claim K1, further comprising incrementing at least one of the synchronization tokens maintained by the coordinator node in response to at least one of the plurality of requests. |
| K3 | The method of claim K1, wherein each of the synchronization tokens comprises a global commit timestamp maintained by the coordinator node. |
| K4 | The method of claim K1, wherein each of the synchronization tokens comprises a global commit ID maintained by the coordinator node. |

L. Grouped write log operation at worker node.

| | |
|---|---|
| L1 | A method, implemented at least in part by a worker node comprising a processing unit and memory, the worker node being in communication with a coordinator node, for facilitating database transaction processing within a database environment, the method comprising:<br>receiving, for a plurality of database operations, a plurality of requests to store information related to the plurality of database operations in persistent storage;<br>grouping the plurality of requests into an I/O communication; and<br>sending the I/O communication to a storage device |

M. Ordering of commitment suboperations.

| | |
|---|---|
| M1 | A method, implemented at least in part by a worker node and/or a coordinator node, each of the worker node and the coordinator node comprising a processing unit and memory, the worker node being in communication with the coordinator node, for committing a database write operation, the method comprising:<br>(a) precommitting the operation;<br>(b) incrementing a commit timestamp;<br>(c) assigning a commit ID to the operation;<br>(d) writing the operation to a commit log;<br>(e) marking the operation as committed;<br>(f) indicating to a client that the operation has been completed; and<br>(g) releasing write locks associated with the operation;<br>wherein step (a) occurs before steps (b)-(g), steps (b)-(d) occur before steps (e), steps (b) and (d) occur before step (f), step (d) occurs before step (g), and step (b) occurs before step (c). |

Example 9—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 17, computer-readable storage media include memory 1720 and 1725, and storage 1740. The term computer-readable storage media does not include signals and carrier waves. In addition, the term computer-readable storage media does not include communication connections (e.g., 1770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more tangible computer-readable storage media storing computer-executable instructions for causing a server programmed thereby to perform operations for facilitating database transaction processing within a database environment and implementing a first worker node of a database system, the first worker node being in communication with a coordinator node and at least a second worker node, the operations comprising:
   sending a request to the coordinator node for at least a first synchronization token maintained by the coordinator node, the at least a first synchronization token representing a most recent commit state known to at least the coordinator node;
   receiving the at least a first synchronization token from the coordinator node;
   assigning at least part of the at least a first synchronization token to a global snapshot as a snapshot ID value;
   executing at least part of a query that involves the global snapshot using the snapshot ID value, the executing comprising:
      accessing a record version of a database record;
      determining a commit ID associated with the record version of the database record;
      comparing the commit ID with the snapshot ID value; and
      based on the comparing, determining whether the record version of the database record will be visible to the at least part of the query; and
   forwarding the snapshot ID value to the at least a second worker node, wherein the at least a second worker node executes at least part of the query that involves the global snapshot using the snapshot ID value sent by the first worker node.

2. The one or more tangible computer-readable storage media of claim 1, wherein the record version of the database record is visible to the at least part of the query if the record version of the database record has been committed and has a commit ID value that is less than or equal to the snapshot ID value.

3. The one or more tangible computer-readable storage media of claim 1, further comprising, when executing the at least part of the query that involves the global snapshot, determining whether the record version of the database record is visible to the at least part of the query by comparing the snapshot ID value to a precommit ID value associated with the record version of the database record.

4. The one or more tangible computer-readable storage media of claim 1, further comprising executing the at least part of the query at the at least the second worker node using the snapshot ID value.

5. The one or more tangible computer-readable storage media of claim 1, wherein the at least a first synchronization token comprises a global commit ID comprising a timestamp.

6. The one or more tangible computer-readable storage media of claim 1, wherein receiving the at least a first synchronization token from the coordinator node comprises receiving a watermark value cached by the coordinator node and associated with status of the first worker node, the operations further comprising comparing the cached watermark value to a current watermark value maintained by the first worker node.

7. The one or more tangible computer-readable storage media of claim 6, further comprising aborting or restarting the at least part of the query if the cached watermark value is less than the current watermark value maintained by the first worker node.

8. The one or more tangible computer-readable storage media of claim 1, wherein receiving the at least a first synchronization token from the coordinator node comprises receiving a watermark value cached by the coordinator node and associated with status of the at least the second worker node, the operations further comprising comparing the cached watermark value to a current watermark value maintained by the at least the second worker node.

9. The one or more tangible computer-readable storage media of claim 8, further comprising aborting or restarting the at least part of the query if the cached watermark value is less than the current watermark value maintained by the at least the second worker node.

10. The one or more tangible computer-readable storage media of claim 1, wherein the snapshot ID value is or is derived from the at least part of the at least a first synchronization token.

11. The one or more tangible computer-readable storage media of claim 1, further comprising sending a notification to end the global snapshot to the coordinator node.

12. The one or more tangible computer-readable storage media of claim 11, wherein the notification to end the global snapshot is sent asynchronously to the coordinator node such that the first worker node continues processing without awaiting a reply to the notification.

13. The one or more tangible computer-readable storage media of claim 1, further comprising:
   precommitting at least a portion of a multi-node database write operation;
   storing a precommit log entry associated with the at least a portion of the multi-node database write operation;
   sending a precommit notification to the coordinator node;
   receiving from the coordinator node a global commit ID associate with the multi-node database write operation;
   incrementing, if appropriate, a local commit ID maintained by the first worker node;
   sending the local commit ID to the coordinator node;
   assigning the local commit ID as a commit ID for the multi-node database write operation; and
   storing a write log entry associated with commitment of the multi-node database write operation.

14. A computing device implementing a server, the computing device comprising one or more hardware processors and one or more memories coupled to the one or more hardware processors, the one or more memories storing computer-executable instructions for causing the computing device to perform operations implementing a first worker node that facilitates database transaction processing within a database environment, the first worker node being in communication with a coordinator node and at least a second worker node, the operations comprising:
- sending a request to the coordinator node for at least a first synchronization token maintained by the coordinator node, the at least a first synchronization token representing a most recent commit state known to at least the coordinator node;
- receiving the at least a first synchronization token from the coordinator node;
- assigning at least part of the at least a first synchronization token to a global snapshot as a snapshot ID value;
- executing at least part of a query that involves the global snapshot using the snapshot ID value, the executing comprising:
  - accessing a record version of a database record;
  - determining a commit ID associated with the record version of the database record;
  - comparing the commit ID with the snapshot ID value; and
  - based on the comparing, determining whether the record version of the database record will be visible to the at least part of the query; and
- forwarding the snapshot ID value to the at least a second worker node, wherein the at least a second worker node executes at least part of the query that involves the global snapshot using the snapshot ID value sent by the first worker node.

15. The computing device of claim 14, wherein the record version of the database record is visible to the at least part of the query if the record version of the database record has been committed and has a commit ID value that is less than or equal to the snapshot ID value.

16. The computing device of claim 14, further comprising, when executing the at least part of the query that involves the global snapshot, determining whether the record version of the database record is visible to the at least part of the query by comparing the snapshot ID value to a precommit ID value associated with the record version of the database record.

17. The computing device of claim 14, further comprising executing the at least part of the query at the at least a second worker node using the snapshot ID value.

18. The computing device of claim 14, wherein the at least a first synchronization token comprises a global commit ID comprising a timestamp.

19. The computing device of claim 14, wherein receiving the at least a first synchronization token from the coordinator node comprises receiving a watermark value cached by the coordinator node and associated with status of the first worker node, the operations further comprising comparing the cached watermark value to a current watermark value maintained by the first worker node.

20. The computing device of claim 19, further comprising aborting or restarting the at least part of the query if the cached watermark value is less than the current watermark value maintained by the first worker node.

21. The computing device of claim 14, wherein receiving the at least a first synchronization token from the coordinator node comprises receiving a watermark value cached by the coordinator node and associated with status of the at least a second worker node, the operations further comprising comparing the cached watermark value to a current watermark value maintained by the at least a second worker node.

22. The computing device of claim 21, further comprising aborting or restarting the at least part of the query if the cached watermark value is less than the current watermark value maintained by the at least a second worker node.

23. The computing device of claim 14, wherein the snapshot ID value is or is derived from the at least part of the at least a first synchronization token.

24. The computing device of claim 14, further comprising sending a notification to end the global snapshot to the coordinator node.

25. The computing device of claim 24, wherein the notification to end the global snapshot is sent asynchronously to the coordinator node such that the first worker node continues processing without awaiting a reply to the notification.

26. The computing device of claim 14, further comprising:
- precommitting at least a portion of a multi-node database write operation;
- storing a precommit log entry associated with the at least a portion of the multi-node database write operation;
- sending a precommit notification to the coordinator node;
- receiving from the coordinator node a global commit ID associate with the multi-node database write operation;
- incrementing, if appropriate, a local commit ID maintained by the first worker node;
- sending the local commit ID to the coordinator node;
- assigning the local commit ID as a commit ID for the multi-node database write operation; and
- storing a write log entry associated with commitment of the multi-node database write operation.

27. A method, implemented by at least one computing device comprising at least one hardware processor and one or more tangible memories in communication with the at least one hardware processor, the one or more tangible memories storing computer-executable instructions for causing the at least one computing device to implement a coordinator node of a database system, the coordinator node being in communication with a worker node, wherein the coordinator node is further configured to perform a method for facilitating database transaction processing within a database environment, the method comprising:
- receiving a request from the worker node for a global synchronization token maintained by the coordinator node, the global synchronization token representing a most recent commit state known to at least the coordinator node;
- starting a global snapshot associated with the request;
- sending at least one global synchronization token to the worker node;
- receiving a notification from the worker node to end the global snapshot associated with the request, the notification being sent asynchronously by the worker node such that the worker node continues processing without awaiting a reply to the notification;
- ending the global snapshot associated with the request; and
- removing the global snapshot from a list of active global snapshots, wherein the list of active global snapshots is useable to remove record versions that are no longer needed for an active query.

28. The method of claim 27, wherein starting the global snapshot associated with the request comprises adding the global snapshot to the list of active global snapshots.

29. The method of claim 27, wherein each global snapshot of the list of active global snapshots is associated with a timestamp.

30. The method of claim 29, further comprising:
- maintaining a minimum active global timestamp value representing an oldest timestamp for the active global snapshots in the list of active global snapshots.

31. The method of claim 30, further comprising:
sending the minimum active global timestamp value to the worker node for version garbage collection.

32. The method of claim 27, wherein the requesting and sending the at least one global synchronization token are carried out synchronously such that the worker node blocks at least some operations until receiving the at least one global synchronization token.

33. One or more tangible computer-readable storage media storing computer-executable instructions for causing a computing device programmed thereby to implement a coordinator node that performs operations that facilitate database transaction processing within a database environment, the coordinator node being in communication with a worker node, the operations comprising:
receiving a request from the worker node for a global synchronization token maintained by the coordinator node, the global synchronization token representing a most recent commit state known to at least the coordinator node;
starting a global snapshot associated with the request;
sending at least one global synchronization token to the worker node;
receiving a notification from the worker node to end the global snapshot associated with the request, the notification being sent asynchronously by the worker node such that the worker node continues processing without awaiting a reply to the notification;
ending the global snapshot associated with the request; and
removing the global snapshot from a list of active global snapshots, wherein the list of active global snapshots is useable to remove record versions that are no longer needed for an active query.

34. The one or more tangible computer-readable storage media of claim 33, wherein starting the global snapshot associated with the request comprises adding the global snapshot to the list of active global snapshots.

35. The one or more tangible computer-readable storage media of claim 33, wherein each global snapshot of the list of active global snapshots is associated with a timestamp.

36. The one or more tangible computer-readable storage media of claim 35, further comprising:
maintaining a minimum active global timestamp value representing an oldest timestamp for active global snapshots in the list of active global timestamps.

37. The one or more tangible computer-readable storage media of claim 36, further comprising:
sending the minimum active global timestamp value to the worker node for version garbage collection.

38. The one or more tangible computer-readable storage media of claim 33, wherein the requesting and sending the at least one global synchronization token are carried out synchronously such that the worker node blocks at least some operations until receiving the at least one global synchronization token.

39. A method, implemented by at least one computing device comprising at least one hardware processor and one or more tangible memories in communication with the at least one hardware processor, the one or more tangible memories storing computer-executable instructions for causing the at least one computing device to implement a coordinator node of a database system, the coordinator node being in communication at least with a first worker node, wherein the coordinator node is further configured to perform a method for facilitating database transaction processing within a database environment, the method comprising:
receiving a request from the first worker node for at least first, second, and third synchronization tokens;
starting a global snapshot associated with the request, the global snapshot associated with a query executable at least in part at the first worker node and executable at least in part at a second worker node;
sending the at least first, second, and third synchronization tokens to the first worker node, the second synchronization token comprising a watermark value cached by the coordinator node and associated with status of the first worker node, indicating a number of times the first worker node has been restarted, and the third synchronization token comprising a watermark value cached by the coordinator node and associated with the status of the second worker node, indicating a number of times the second worker node has been restarted, wherein the watermark values can be compared with current values of respective worker nodes to determine if current states of the respective worker nodes match states associated with the second and third synchronization tokens;
receiving a notification from the first worker node to end the global snapshot associated with the request; and
ending the global snapshot associated with the request.

40. The method of claim 39, wherein starting the global snapshot associated with the request comprises adding the global snapshot to a list of global active snapshots.

41. The method of claim 40, wherein each global snapshot of the list of global active snapshots is associated with a timestamp.

42. The method of claim 41, further comprising:
maintaining a minimum active global timestamp value representing an oldest timestamp for active global snapshots in the list of global active snapshots.

43. The method of claim 42, further comprising:
sending the minimum active global timestamp value to the first worker node for version garbage collection.

44. The method of claim 39, wherein the requesting and sending the at least first, second, and third synchronization tokens are carried out synchronously such that the first worker node blocks at least some operations until receiving the at least first, second, and third synchronization tokens.

45. A computing device implementing a server, the computing device comprising one or more hardware processors and one or more memories coupled to the one or more hardware processors, the one or more memories storing computer-executable instructions for causing the computing device to perform operations implementing a coordinator node that facilitates database transaction processing within a database environment, the coordinator node being in communication with a first worker node, the operations comprising:
receiving a request from the first worker node for at least first, second, and third synchronization tokens;
starting a global snapshot associated with the request, the global snapshot associated with a query executable at least in part at the first worker node and executable at least in part at a second worker node;
sending the at least first, second, and third synchronization tokens to the first worker node, the second synchronization token comprising a watermark value cached by the coordinator node and associated with status of the first worker node, indicating a number of times the first worker node has been restarted, and the third synchronization token comprising a watermark value cached by the coordinator node and associated with the status of the second worker, indicating a number of times the second worker node has been restarted, wherein the watermark values can be compared with current values of respective worker nodes to determine if current states of the respective worker nodes match states associated with the second and third synchronization tokens;

receiving a notification from the first worker node to end the global snapshot associated with the request; and ending the global snapshot associated with the request.

46. The computing device of claim 45, wherein starting the global snapshot associated with the request comprises adding the global snapshot to a list of global active snapshots.

47. The computing device of claim 45, wherein each global snapshot of the list of global active snapshots is associated with a timestamp.

48. The computing device of claim 47, further comprising:

maintaining a minimum active global timestamp value representing an oldest timestamp for the active global snapshots in the list of global active snapshots.

49. The computing device of claim 48, further comprising:

sending the minimum active global timestamp value to the first worker node for version garbage collection.

50. The computing device of claim 45, wherein the requesting and sending the first, second, and third synchronization tokens are carried out synchronously such that the first worker node blocks at least some operations until receiving the first, second, and third synchronization tokens.

* * * * *